US012677201B2

(12) United States Patent
Sun et al.

(10) Patent No.: US 12,677,201 B2
(45) Date of Patent: Jul. 7, 2026

(54) COMMUNICATION METHOD FOR PERFORMING CROSS-NETWORK ACCESS CONTROL AND ASSOCIATED COMMUNICATION APPARATUS, MEDIUM, AND CHIP

(71) Applicant: HUAWEI TECHNOLOGIES CO., LTD., Shenzhen (CN)

(72) Inventors: Fei Sun, Shanghai (CN); Haiyan Luo, Shenzhen (CN); Yuanping Zhu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 686 days.

(21) Appl. No.: 18/073,842

(22) Filed: Dec. 2, 2022

(65) Prior Publication Data

US 2023/0094040 A1      Mar. 30, 2023

Related U.S. Application Data

(63) Continuation of application No. PCT/CN2021/096340, filed on May 27, 2021.

(30) Foreign Application Priority Data

Jun. 3, 2020      (CN) .......................... 202010496861.9

(51) Int. Cl.
*H04W 36/14* (2009.01)
*H04W 36/00* (2009.01)

(52) U.S. Cl.
CPC ....... *H04W 36/14* (2013.01); *H04W 36/0064* (2023.05); *H04W 36/13* (2023.05)

(58) Field of Classification Search
CPC . H04W 36/0011; H04W 36/13; H04W 36/00; H04W 36/1443; H04W 36/0072;
(Continued)

(56) References Cited

U.S. PATENT DOCUMENTS

2010/0157944 A1* 6/2010 Horn ................. H04W 36/0005
370/331
2018/0368140 A1* 12/2018 Centonza .............. H04W 72/27
(Continued)

FOREIGN PATENT DOCUMENTS

CN      107820291 A      3/2018
CN      108616959 A      10/2018
(Continued)

OTHER PUBLICATIONS

3GPP TS 23.502 V16.4.0, "3rd Generation Partnership Project; Technical Specification Group Services and System Aspects; Procedures for the 5G System (5GS); Stage 2 (Release 16)," Mar. 2020, 582 pages.
(Continued)

*Primary Examiner* — Allahyar Kasraian
(74) *Attorney, Agent, or Firm* — Fish & Richardson P.C.

(57) ABSTRACT
The present disclosure relates to communication methods, apparatuses, mediums, and chips. In one example communication method, a target access network device receives first information, where the first information indicates a relationship between a first network slice in a first network and a second network slice in a second network, and the first network is different from the second network. The target access network device performs access control from a terminal device to the target access network device based on at least the first information.

19 Claims, 9 Drawing Sheets

(58) Field of Classification Search
CPC ......... H04W 36/0019; H04W 36/0058; H04W 36/14
See application file for complete search history.

(56) References Cited

U.S. PATENT DOCUMENTS

| | | | | | |
|---|---|---|---|---|---|
| 2019/0028941 | A1* | 1/2019 | Zee | .................. | H04W 36/0077 |
| 2021/0037455 | A1* | 2/2021 | Zhu | ....................... | H04W 76/27 |
| 2023/0054288 | A1* | 2/2023 | Gao | .................. | H04W 36/0064 |
| 2023/0056120 | A1* | 2/2023 | Fu | ......................... | H04W 24/04 |
| 2023/0189111 | A1* | 6/2023 | Bulakci | ................ | H04W 48/18 |
| | | | | | 370/331 |

FOREIGN PATENT DOCUMENTS

| | | |
|---|---|---|
| CN | 108632927 A | 10/2018 |
| CN | 110035461 A | 7/2019 |
| CN | 110603854 A | 12/2019 |
| EP | 3596969 B1 | 12/2021 |
| WO | 2018082221 A1 | 5/2018 |
| WO | 2020034983 A1 | 2/2020 |

OTHER PUBLICATIONS

3GPP TS 23.501 V16.4.0, "3rd Generation Partnership Project; Technical Specification Group Services and System Aspects; System architecture for the 5G System (5GS); Stage 2 (Release 16)," Mar. 2020, 430 pages.

3GPP TS 38.300 V16.1.0, "3rd Generation Partnership Project; Technical Specification Group Radio Access Network; NR; NR and NG-RAN Overall Description; Stage 2 (Release 16)," Mar. 2020, 133 pages.

International Search Report and Written Opinion in International Appln. No. PCT/CN2021/096340, mailed on Jul. 15, 2021, 15 pages (with English translation).

Ericsson, "Slice re-mapping or removal during mobility," 3GPP TSG-RAN WG3 #95bis, R3-171143, Spokane, WA, USA, Apr. 3-7, 2017, 5 pages.

Extended European Search Report in European Appln No. 21818827. 4, dated Oct. 16, 2023, 11 pages.

* cited by examiner

100

120-N

Network slice

...

120-2

Network slice 120-1

Network slice

110

Infrastructure pool

700

800

900

1000

1100

1200

1300

1400

COMMUNICATION METHOD FOR PERFORMING CROSS-NETWORK ACCESS CONTROL AND ASSOCIATED COMMUNICATION APPARATUS, MEDIUM, AND CHIP

CROSS-REFERENCE TO RELATED APPLICATIONS

This application is a continuation of International Application No. PCT/CN2021/096340, filed on May 27, 2021, which claims priority to Chinese Patent Application No. 202010496861.9, filed on Jun. 3, 2020. The disclosures of the aforementioned applications are hereby incorporated by reference in their entireties.

TECHNICAL FIELD

This disclosure relates to the communication field, and more specifically, to a communication method, and an associated communication apparatus, medium, and chip.

BACKGROUND

With development of mobile communication technologies, various new services and application scenarios continuously emerge, and requirements of these services for network functions, connection performance, security, and the like are greatly different. If a single network is used to carry these services, it is difficult to satisfy diversified requirements for a high bandwidth, a low latency, and high reliability at the same time. In addition, building a new network for each type of service brings huge costs. This requires a network to be flexible and scalable, and to satisfy different service requirements. Therefore, a new generation network system, for example, a 5th generation (5G) mobile communication technology system, proposes a network slicing technology. The technology provides network services for different users and differentiated services of the users through flexible allocation of network resources and on-demand networking.

Due to network slice deployment, network slices supported by different cells or different access network devices are different. For example, a part of cells or access network devices do not support some network slices or a network slice, or even if a function of a network slice is supported, the part of cells or access network devices cannot provide a corresponding network slice for a terminal device to serve due to operator deployment or an operator policy. In consideration of mobility and service change requirements of the terminal device, the terminal device may register with or be handed over to different access network devices. Therefore, access and services of the terminal device need to be implemented when different access network devices provide differentiated support for network slices.

SUMMARY

Example embodiments of this disclosure provide a solution for supporting access control on a terminal device in a communication system.

According to a first aspect of this disclosure, a communication method is provided. The method includes: A target access network device receives first information, where the first information indicates a relationship between a first network slice in a first network and a second network slice in a second network, and the first network is different from the second network; and the target access network device performs access control from a terminal device to the target access network device based on at least the first information.

The target access network device can perform cross-network access control on the terminal device by providing information indicating a relationship between network slices in different networks for the target access network device. In this solution, an access latency can be reduced, a service interruption problem caused by session rejection of the terminal device can be reduced, and service continuity of the terminal device can be ensured.

In some embodiments, the first information includes an identifier of the first network, an identifier of the first network slice, an identifier of the second network, and an identifier of the second network slice. In some embodiments, the identifier of the first network and the identifier of the second network include respective public land mobile network identifiers of the first network and the second network. In some embodiments, the identifier of the first network slice and the identifier of the second network slice include respective single network slice selection assistance information of the first network slice and the second network slice. Therefore, in the first information, an identifier of a network and an identifier of a slice may be used to indicate a relationship between the corresponding network and the network slice in the network.

In some embodiments, the first information is re-mapping policy information used for the first network slice and the second network slice. Based on this first information, the target access network device can determine, during access control, whether to support access of the terminal device through re-mapping between network slices.

In some embodiments, the receiving first information includes. The target access network device receives the first information from a core network device. In these embodiments, the core network device can determine the first information by combining information reported by a plurality of access network devices, so that the first information is applicable to access control performed by the plurality of access network devices on the terminal device. In some embodiments, the first network and the second network are in a same tracking area range. On a core network side, the core network device may determine and provide the first information by comprehensively considering a relationship between network slices in networks in a specific area. Because the first information covers the relationship between network slices in networks in a specific area, regardless of whether the terminal device needs to access any network in the area, a corresponding target access network device can perform access control based on the first information.

In some embodiments, the first information is included in an NG setup response. The NG setup response may be transmitted from a core network to the target access network device, and is usually used as a response to an NG setup message of the target access network device. In this manner, the target access network device may obtain, in advance in an interface setup phase, the first information used for access control.

In some embodiments, the communication method in the first aspect further includes: The target access network device receives second information from a source access network device, where the second information includes an identifier of a third network slice allowed to be used by the terminal device in the second network. In some embodiments, the performing access control based on at least the first information includes: The target access network device performs access control based on the first information and the second information. With the help of the first information and the second information, the target access network device can better determine a network slice allowed by the terminal device in the second network. This is particularly advantageous for a scenario in which network slices allowed by different terminal devices in different networks differ.

In some embodiments, the receiving first information includes: The target access network device receives the first information for the terminal device from a source access network device, where the first network is a serving network of the terminal device. In these embodiments, the target access network device may obtain, through interaction with the source access network device, more targeted first information for performing access control on the terminal device. A reduction in an information amount of the first information can further reduce transmission overheads between access network devices.

In some embodiments, the second network includes a target network of the terminal device. This means that the first information indicates a relationship between the serving network specific to the current terminal device and a network slice in the target network. Therefore, the target access network device does not need to receive and retain excessive redundant information.

In some embodiments, the first information is included in a handover request for the terminal device. Therefore, the first information is timely provided to the target access network device only when it is determined that the terminal device needs to be handed over to a target network of the target access network device. The target access network device can perform access control on the terminal device in a handover process based on the information.

In some embodiments, the performing access control includes: The target access network device determines an identifier of the serving network of the terminal device, an identifier of a serving network slice in the serving network, and an identifier of the target network of the terminal device; the target access network device determines, in the first information based on the identifier of the serving network, the identifier of the serving network slice, and the identifier of the target network, a target network slice related to the serving network slice in the target network; and the target access network device performs access control based on determining of the target network slice. In this manner, with the help of the first information, the target access network device can effectively implement access control, to avoid a handover latency, reduce service interruption caused by session rejection of the terminal device after handover, and ensure service continuity.

According to a second aspect of this disclosure, a communication method is provided. The method includes: A source access network device receives first information for a terminal device from a core network device, where the first information indicates a relationship between a first network slice in a first network and a second network slice in a second network, the first network is a serving network of the terminal device, and the first network is different from the second network; and the source access network device transmits the first information to a target access network device.

In this manner, with the help of the first information that is specific to the terminal device and that is provided by the source access network device, the target access network device can perform cross-network access control on the terminal device, to reduce an access latency, reduce a service interruption problem caused by session rejection of the terminal device, and ensure service continuity of the terminal device. Because the first information relates to the serving network specific to the terminal device, a reduction in an information amount of the first information further reduces transmission overheads between the core network device and the access network device.

In some embodiments, the first information includes an identifier of the first network, an identifier of the first network slice, an identifier of the second network, and an identifier of the second network slice. In some embodiments, the identifier of the first network and the identifier of the second network include respective public land mobile network identifiers of the first network and the second network. In some embodiments, the identifier of the first network slice and the identifier of the second network slice include respective single network slice selection assistance information of the first network slice and the second network slice. Therefore, in the first information, an identifier of a network and an identifier of a slice may be used to indicate a relationship between the corresponding network and the network slice in the network.

In some embodiments, the first information is re-mapping policy information used for the first network slice and the second network slice. Based on this first information, the target access network device can determine, during access control, whether to support access of the terminal device through re-mapping between network slices.

In some embodiments, the second network includes a target network of the terminal device. This means that the first information indicates a relationship between the serving network specific to the current terminal device and a network slice in the target network. Therefore, the target access network device does not need to receive and retain excessive redundant information.

In some embodiments, the first information is included in a handover request for the terminal device. Therefore, the first information is timely provided to the target access network device only when it is determined that the terminal device needs to be handed over to a target network of the target access network device. The target access network device can perform access control on the terminal device in a handover process based on the information.

In some embodiments, the communication method in the second aspect further includes: The source access network device transmits third information to the terminal device if access from the terminal device to the target access network device is allowed, where the third information indicates that the serving network of the terminal device is handed over from the first network to the second network. In this manner, in a case of cross-network access, the terminal device can quickly learn of a change of the serving network by using the received third information.

In some embodiments, the third information includes an identifier of the second network. The identifier of the second network is provided for the terminal device, to help the terminal device determine a specific network to which the terminal device is handed over from a current network.

In some embodiments, the third information is included in a radio resource control reconfiguration message. Therefore, the terminal device may determine, by using the message, that a radio resource control connection needs to be reconfigured, and can further learn of a change of the serving network.

In some embodiments, the communication method in the second aspect further includes: The source access network device transmits fourth information to the terminal device if access from the terminal device to the target access network device is allowed, where the fourth information indicates that a session of the terminal device is changed to be served by the second network slice in the second network. In this manner, in a case of cross-network access, the terminal device can not only quickly learn of a change of the serving network, but also determine a to-be-accessed network slice by using the received fourth information.

According to a third aspect of this disclosure, a communication method is provided. The method includes: A terminal device receives third information from a source access network device, where the third information indicates that a serving network of the terminal device is handed over from a first network to a second network, and the first network is different from the second network; and the terminal device uses the third information. In this manner, in a case of cross-network access, the terminal device can quickly learn of a change of the serving network by using the received third information, and correspondingly use the third information.

In some embodiments, the using the third information includes: The terminal device performs random access to a target access network device in the second network based on the third information. The third information helps guide a random access process of the terminal device, and increase a random access success possibility. In some embodiments, the using the third information includes: The terminal device displays an identifier of the second network based on the third information. A user of the terminal device may be notified of the change of the serving network by displaying the identifier of the second network.

In some embodiments, the third information includes an identifier of the second network. The identifier of the second network is provided for the terminal device, to help the terminal device determine a specific network to which the terminal device is handed over from a current network.

In some embodiments, the third information is included in a radio resource control reconfiguration message. Therefore, the terminal device may determine, by using the message, that a radio resource control connection needs to be reconfigured, and can further learn of a change of the serving network.

In some embodiments, the communication method in the third aspect further includes: The terminal device receives fourth information from the source access network device if access from the terminal device to a target access network device is allowed, where the fourth information indicates that a session of the terminal device is changed to be served by the second network slice in the second network. In this manner, in a case of cross-network access, the terminal device can not only quickly learn of a change of the serving network, but also determine a to-be-accessed network slice by using the received fourth information.

According to a fourth aspect of this disclosure, a communication method is provided. The method includes: A core network device determines first information, where the first information indicates a relationship between a first network slice in a first network and a second network slice in a second network, and the first network is different from the second network; and the core network device transmits the first information to an access network device, for access control from a terminal device to the access network device.

In this manner, the core network device provides the first information for the target access network device, so that the target access network device can perform cross-network access control on the terminal device by using the first information, to reduce an access latency, reduce a service interruption problem caused by session rejection of the terminal device, and ensure service continuity of the terminal device.

In some embodiments, the first information includes an identifier of the first network, an identifier of the first network slice, an identifier of the second network, and an identifier of the second network slice. In some embodiments, the identifier of the first network and the identifier of the second network include respective public land mobile network identifiers of the first network and the second network. In some embodiments, the identifier of the first network slice and the identifier of the second network slice include respective single network slice selection assistance information of the first network slice and the second network slice. Therefore, in the first information, an identifier of a network and an identifier of a slice may be used to indicate a relationship between the corresponding network and the network slice in the network.

In some embodiments, the first information is re-mapping policy information used for the first network slice and the second network slice. Based on this first information, the target access network device can determine, during access control, whether to support access of the terminal device through re-mapping between network slices.

In some embodiments, the first network is a serving network of the terminal device, and the terminal device is served by the first network through the access network device. In some embodiments, the second network includes a target network of the terminal device. In this way, it can be ensured that when the terminal device is handed over from the serving network to the target network, the target access network device can perform access control based on the obtained first information.

In some embodiments, the first network and the second network are in a same tracking area range. On a core network side, the core network device may determine and provide the first information by comprehensively considering a relationship between network slices in networks in a specific area. Because the first information covers the relationship between network slices in networks in a specific area, regardless of whether the terminal device needs to access any network in the area, a corresponding target access network device can perform access control based on the first information.

In some embodiments, the first information is included in an NG setup response. The NG setup response may be transmitted from a core network to the target access network device, and is usually used as a response to an NG setup message of the target access network device. In this manner, the target access network device may obtain, in advance in an interface setup phase, the first information used for access control.

According to a fifth aspect of this disclosure, a communication apparatus implemented at a target access network device is provided. The communication apparatus includes: a first receiving unit, configured to receive first information, where the first information indicates a relationship between a first network slice in a first network and a second network slice in a second network, and the first network is different from the second network; and an access control unit, configured to perform access control from a terminal device to the target access network device based on at least the first information.

In some embodiments, the first information includes an identifier of the first network, an identifier of the first network slice, an identifier of the second network, and an identifier of the second network slice. In some embodiments, the identifier of the first network and the identifier of the second network include respective public land mobile network identifiers of the first network and the second network, and the identifier of the first network slice and the identifier of the second network slice include respective single network slice selection assistance information of the first network slice and the second network slice.

In some embodiments, the first information is re-mapping policy information used for the first network slice and the second network slice.

In some embodiments, the first receiving unit is further configured to receive the first information from a core network device. In some embodiments, the first network and the second network are in a same tracking area range.

In some embodiments, the first information is included in an NG setup response.

In some embodiments, the communication apparatus further includes: a second receiving unit, configured to receive second information from a source access network device, where the second information includes an identifier of a third network slice allowed to be used by the terminal device in the second network. In some embodiments, the access control unit is further configured to perform access control based on the first information and the second information.

In some embodiments, the first receiving unit is further configured to receive the first information for the terminal device from a source access network device, where the first network is a serving network of the terminal device.

In some embodiments, the second network includes a target network of the terminal device.

In some embodiments, the first information is included in a handover request for the terminal device.

In some embodiments, the access control unit is further configured to: determine, by the target access network device, an identifier of the serving network of the terminal device, an identifier of a serving network slice in the serving network, and an identifier of the target network of the terminal device, determine, by the target access network device, in the first information based on the identifier of the serving network, the identifier of the serving network slice, and the identifier of the target network, a target network slice related to the serving network slice in the target network; and perform, by the target access network device, access control based on determining of the target network slice.

According to a sixth aspect of this disclosure, a communication apparatus implemented at a source access network device is provided. The communication apparatus includes: a receiving unit, configured to receive first information for a terminal device from a core network device, where the first information indicates a relationship between a first network slice in a first network and a second network slice in a second network, the first network is a serving network of the terminal device, and the first network is different from the second network; and a first transmission unit, configured to transmit the first information to a target access network device.

In some embodiments, the first information includes an identifier of the first network, an identifier of the first network slice, an identifier of the second network, and an identifier of the second network slice. In some embodiments, the identifier of the first network and the identifier of the second network include respective public land mobile network identifiers of the first network and the second network, and the identifier of the first network slice and the identifier of the second network slice include respective single network slice selection assistance information of the first network slice and the second network slice.

In some embodiments, the first information is re-mapping policy information used for the first network slice and the second network slice.

In some embodiments, the second network includes a target network of the terminal device.

In some embodiments, the first information is included in a handover request for the terminal device.

In some embodiments, the communication apparatus further includes: a second transmission unit, configured to transmit third information to the terminal device when access from the terminal device to the target access network device is allowed, where the third information indicates that the serving network of the terminal device is handed over from the first network to the second network.

In some embodiments, the third information includes an identifier of the second network.

In some embodiments, the third information is included in a radio resource control reconfiguration message.

In some embodiments, the communication apparatus further includes: a third transmission unit, configured to transmit fourth information to the terminal device if access from the terminal device to the target access network device is allowed, where the fourth information indicates that a session of the terminal device is changed to be served by the second network slice in the second network.

According to a seventh aspect of this disclosure, a communication apparatus implemented at a terminal device is provided. The communication apparatus includes: a first receiving unit, configured to receive third information from a source access network device, where the third information indicates that a serving network of the terminal device is handed over from a first network to a second network, and the first network is different from the second network. The communication apparatus further includes: an information using unit, configured to use the third information.

In some embodiments, the information using unit is configured to perform random access to a target access network device in the second network based on the third information. In some embodiments, the information using unit is configured to display an identifier of the second network based on the third information.

In some embodiments, the third information includes an identifier of the second network.

In some embodiments, the third information is included in a radio resource control reconfiguration message.

In some embodiments, the communication apparatus further includes: a second receiving unit, configured to receive fourth information from the source access network device if access from the terminal device to a target access network device is allowed, where the fourth information indicates that a session of the terminal device is changed to be served by the second network slice in the second network.

According to an eighth aspect of this disclosure, a communication apparatus implemented at a core network device is provided. The communication apparatus includes, a determining unit, configured to determine first information, where the first information indicates a relationship between a first network slice in a first network and a second network slice in a second network, and the first network is different from the second network; and a transmission unit, configured to transmit the first information to an access network device, for access control from a terminal device to the access network device.

In some embodiments, the first information includes an identifier of the first network, an identifier of the first network slice, an identifier of the second network, and an identifier of the second network slice. In some embodiments, the identifier of the first network and the identifier of the second network include respective public land mobile network identifiers of the first network and the second network, and the identifier of the first network slice and the identifier of the second network slice include respective single network slice selection assistance information of the first network slice and the second network slice.

In some embodiments, the first information is re-mapping policy information used for the first network slice and the second network slice.

In some embodiments, the first network is a serving network of the terminal device, and the terminal device is served by the first network through the access network device; and the second network includes a target network of the terminal device.

In some embodiments, the first network and the second network are in a same tracking area range.

In some embodiments, the first information is included in an NG setup response.

According to a ninth aspect of this disclosure, a computer-readable storage medium is provided. The computer-readable storage medium stores a computer program; and when the computer program is executed by a processor, an operation in the method according to any one of the first aspect to the fourth aspect and the possible implementations of the first aspect to the fourth aspect is implemented.

According to a tenth aspect of this disclosure, this disclosure provides a chip. The chip is configured to perform an operation in the method according to any one of the first aspect to the fourth aspect and the possible implementations of the first aspect to the fourth aspect.

According to an eleventh aspect of this disclosure, a communication device is provided. The communication device includes at least one processing unit and at least one memory. The at least one memory is coupled to the at least one processing unit and stores instructions executed by the at least one processing unit. When the instructions are executed by the at least one processing unit, the communication device is enabled to implement an operation in the method according to any one of the first aspect to the fourth aspect and the possible implementations of the first aspect to the fourth aspect.

According to a twelfth aspect of this disclosure, a computer program product is provided. The computer program product is tangibly stored on a computer-readable medium and includes computer-executable instructions. When the computer-executable instructions are executed, a device is enabled to implement an operation in the method according to any one of the first aspect to the fourth aspect and the possible implementations of the first aspect to the fourth aspect.

According to a thirteenth aspect of this disclosure, a communication method is provided. The method includes: A target access network device receives slice identification information from a source access network device, where the slice identification information indicates an identifier of a home network slice of the terminal device in a home network, and the target access network device is located in a visited network of the terminal device; the target access network device receives slice correspondence information from a core network device, where the slice correspondence information indicates a correspondence between a network slice in the visited network and a network slice in the home network; and the target access network device performs access control from the terminal device to the target access network device based on at least the slice identification information and the slice correspondence information.

In this manner, the target access network device can perform access control on the terminal device during cross-network access, especially access control performed when the terminal device needs to access the visited network, to reduce an access latency, reduce a service interruption problem caused by session rejection of the terminal device, and ensure service continuity of the terminal device.

In some embodiments, the communication method in the thirteenth aspect further includes: The target access network device transmits a request for the network slice correspondence information to the core network device, where the request includes at least an identifier of the terminal device and an identifier of the visited network. In some embodiments, the receiving network slice correspondence information includes: The target access network device receives a response to the request from the core network device, and the target access network device obtains the network slice correspondence information from the response. Therefore, the target access network device may request the network slice correspondence information from the core network device only when access control needs to be performed.

In some embodiments, the communication method in the thirteenth aspect further includes: The target access network device receives fifth information for the home network from the core network device, where the fifth information indicates a relationship between the home network slice and another network slice in the home network. In some embodiments, the performing access control based on at least the slice identification information and the slice correspondence information includes: The target access network device performs access control based on the slice identification information, the network slice correspondence information, and the fifth information. With the help of the fifth information, the target access network device can further determine, by using a relationship between network slices in the home network, whether there is another network slice (for example, another network slice having a re-mapping relationship), in the visited network, related to a network slice corresponding to the home network slice.

According to a fourteenth aspect of this disclosure, a communication method is provided. The method includes: A source access network device receives slice identification information for a terminal device, where the slice identification information indicates an identifier of a home network slice of the terminal device in a home network, and the source access network device is located in a first visited network of the terminal device; and the source access network device transmits the slice identification information to a target access network device to which the terminal device is to be handed over, where the target access network device is located in a second visited network of the terminal device.

In this manner, the slice identification information provided by the source access network device for the target access network device can assist in performing access control on the terminal device during cross-network access, especially access control performed when the terminal device needs to access the visited network. This can reduce an access latency, reduce a service interruption problem caused by session rejection of the terminal device, and ensure service continuity of the terminal device.

In some embodiments, the receiving slice identification information includes: The source access network device receives the slice identification information from the terminal device or a core network device. The source access network device can obtain the slice identification information in a plurality of manners.

In some embodiments, the slice identification information is included in a session setup request received from the terminal device. Therefore, the source access network device can obtain the slice identification information from the terminal device at an initial stage of session setup of the terminal device.

In some embodiments, the slice identification information is included in a session resource setup request that is for the terminal device and that is received from the core network device. Therefore, the source access network device can obtain the slice identification information from the core network device at an initial stage of session setup of the terminal device.

According to a fifteenth aspect of this disclosure, a communication method is provided. The method includes: A terminal device transmits slice identification information to a source access network device, where the slice identification information indicates an identifier of a home network slice of the terminal device in a home network, and the source access network device is located in a first visited network of the terminal device; and the terminal device receives third information from the source access network device, where the third information indicates that a serving network of the terminal device is handed over from the first visited network to a second visited network, and the first visited network is different from the second visited network. In this manner, the terminal device provides the slice identification information for the source access network device, and then the source access network device may provide the slice identification information for a target access network device, to assist the target access network device in performing access control on the terminal device during cross-network access, especially access control performed when the terminal device needs to access the visited network. This can reduce an access latency, reduce a service interruption problem caused by session rejection of the terminal device, and ensure service continuity of the terminal device. Further, the terminal device may receive the third information indicating serving network handover, so that the terminal device can quickly learn of a change of the serving network.

In some embodiments, the transmitting slice identification information to a source access network device includes: The terminal device transmits the slice identification information to the source access network device in a session setup request. Therefore, the source access network device can obtain the slice identification information from the terminal device at an initial stage of session setup of the terminal device.

In some embodiments, the communication method in the fifteenth aspect further includes: The terminal device uses the third information. In some embodiments, the using the third information includes: The terminal device performs random access to a target access network device in the second visited network based on the third information. The third information helps guide a random access process of the terminal device, and increase a random access success possibility. In some embodiments, the using the third information includes: The terminal device displays an identifier of the second visited network based on the third information. A user of the terminal device may be notified of the change of the serving network by displaying the identifier of the second visited network.

In some embodiments, the third information includes an identifier of the second visited network. The identifier of the second visited network is provided for the terminal device, to help the terminal device determine a specific network to which the terminal device is handed over from a current network.

In some embodiments, the third information is included in a radio resource control reconfiguration message. Therefore, the terminal device may determine, by using the message, that a radio resource control connection needs to be reconfigured, and can further learn of a change of the serving network.

In some embodiments, the communication method in the fifteenth aspect further includes: The terminal device receives fourth information from the source access network device if access from the terminal device to the target access network device is allowed, where the fourth information indicates that a session of the terminal device is changed to be served by the second visited network slice in the second visited network. In this manner, in a case of cross-network access, the terminal device can not only quickly learn of a change of the serving network, but also determine a to-be-accessed network slice by using the received fourth information.

According to a sixteenth aspect of this disclosure, a communication apparatus implemented at a target access network device is provided. The communication apparatus includes: a first receiving unit, configured to receive slice identification information from a source access network device, where the slice identification information indicates an identifier of a home network slice of the terminal device in a home network, and the target access network device is located in a visited network of the terminal device; a second receiving unit, configured to receive slice correspondence information from a core network device, where the slice correspondence information indicates a correspondence between a network slice in the visited network and a network slice in the home network; and an access control unit, configured to perform access control from the terminal device to the target access network device based on at least the slice identification information and the slice correspondence information.

In some embodiments, the communication apparatus in the sixteenth aspect further includes: a transmission unit, configured to transmit a request for the network slice correspondence information to the core network device, where the request includes at least an identifier of the terminal device and an identifier of the visited network. In some embodiments, the first receiving unit is further configured to: receive a response to the request from the core network device, and obtain the network slice correspondence information from the response.

In some embodiments, the communication apparatus in the sixteenth aspect further includes a third receiving unit, configured to receive fifth information for the home network from the core network device, where the fifth information indicates a relationship between the home network slice and another network slice in the home network. In some embodiments, the access control unit is further configured to perform access control based on the slice identification information, the network slice correspondence information, and the fifth information.

According to a seventeenth aspect of this disclosure, a communication apparatus implemented at a source access network device is provided. The communication apparatus includes: a receiving unit, configured to receive slice identification information for a terminal device, where the slice identification information indicates an identifier of a home network slice of the terminal device in a home network, and the source access network device is located in a first visited network of the terminal device; and a transmission unit, configured to transmit the slice identification information to a target access network device to which the terminal device is to be handed over, where the target access network device is located in a second visited network of the terminal device.

In some embodiments, the receiving unit is further configured to receive, by the source access network device, the slice identification information from the terminal device or a core network device.

In some embodiments, the slice identification information is included in a session setup request received from the terminal device.

In some embodiments, the slice identification information is included in a session resource setup request that is for the terminal device and that is received from the core network device.

According to an eighteenth aspect of this disclosure, a communication apparatus implemented at a terminal device is provided. The communication apparatus includes: a transmission unit, configured to transmit slice identification information, where the slice identification information indicates an identifier of a home network slice of the terminal device in a home network, and the source access network device is located in a visited network of the terminal device; and a first receiving unit, configured to receive third information from the source access network device, where the third information indicates that a serving network of the terminal device is handed over from the first visited network to a second visited network, and the first visited network is different from the second visited network.

In some embodiments, the transmission unit is further configured to: transmit, by the terminal device, the slice identification information to the source access network device in a session setup request.

In some embodiments, the communication apparatus in the eighteenth aspect further includes: an information using unit, configured to use the third information. In some embodiments, the information using unit is further configured to perform random access to a target access network device in the second visited network based on the third information. In some embodiments, the information using unit is further configured to display an identifier of the second visited network based on the third information.

In some embodiments, the third information includes an identifier of the second visited network.

In some embodiments, the third information is included in a radio resource control reconfiguration message.

In some embodiments, the communication apparatus in the eighteenth aspect further includes: a second receiving unit, configured to receive fourth information from the source access network device if access from the terminal device to a target access network device is allowed, where the fourth information indicates that a session of the terminal device is changed to be served by the second visited network slice in the second visited network.

According to a nineteenth aspect of this disclosure, a computer-readable storage medium is provided. The computer-readable storage medium stores a computer program; and when the computer program is executed by a processor, an operation in the method according to any one of the thirteenth aspect to the fifteenth aspect and the possible implementations of the thirteenth aspect to the fifteenth aspect is implemented.

According to a twentieth aspect of this disclosure, this disclosure provides a chip. The chip is configured to perform an operation in the method according to any one of the thirteenth aspect to the fifteenth aspect and the possible implementations of the thirteenth aspect to the fifteenth aspect.

According to a twenty-first aspect of this disclosure, a communication device is provided. The communication device includes at least one processing unit and at least one memory. The at least one memory is coupled to the at least one processing unit and stores instructions executed by the at least one processing unit. When the instructions are executed by the at least one processing unit, the communication device is enabled to implement an operation in the method according to any one of the thirteenth aspect to the fifteenth aspect and the possible implementations of the thirteenth aspect to the fifteenth aspect.

According to a twenty-second aspect of this disclosure, a computer program product is provided. The computer program product is tangibly stored on a computer-readable medium and includes computer-executable instructions. When the computer-executable instructions are executed, a device is enabled to implement an operation in the method according to any one of the thirteenth aspect to the fifteenth aspect and the possible implementations of the thirteenth aspect to the fifteenth aspect.

BRIEF DESCRIPTION OF DRAWINGS

With reference to the accompanying drawings and the following detailed descriptions, features, advantages, and other aspects of the implementations of this disclosure become more apparent. Several implementations of this disclosure are shown herein by way of example but not limitation. In the accompanying drawings, details are as follows.

In the accompanying drawings, same or similar reference numerals represent same or similar elements.

DESCRIPTION OF EMBODIMENTS

Figure 1:
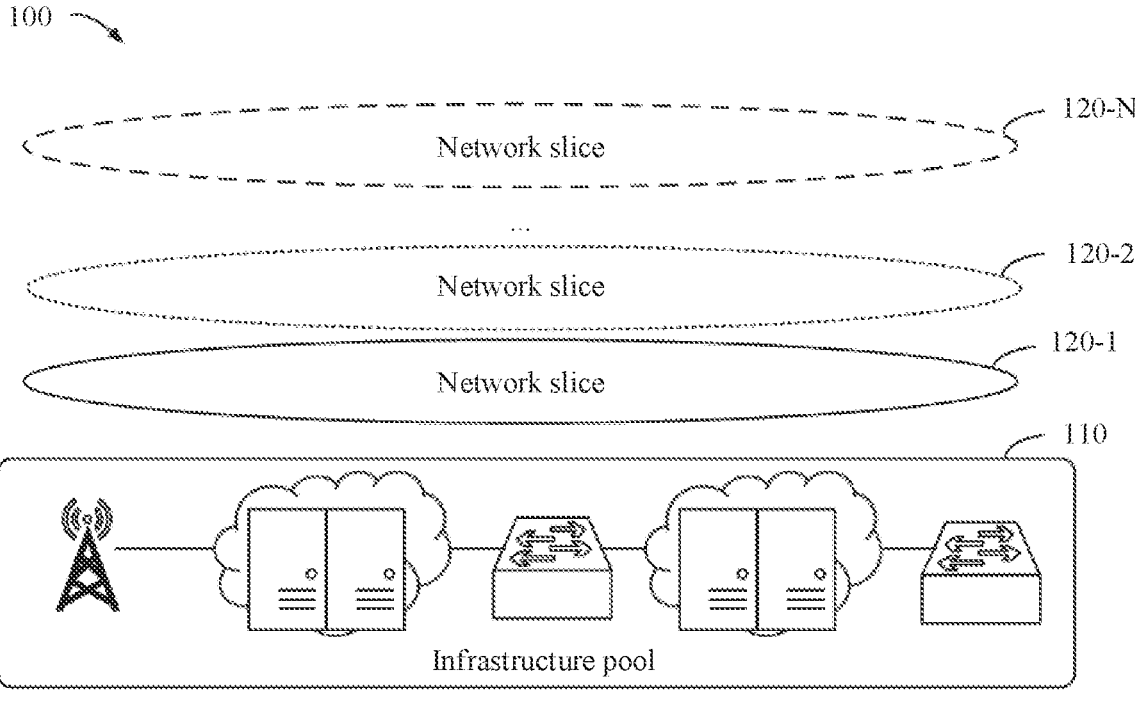
FIG. 1 is a schematic block diagram of a network slice-based communication environment according to embodiments of this disclosure.

The following describes embodiments of this disclosure in detail with reference to the accompanying drawings. Although some embodiments of this disclosure are shown in the accompanying drawings, it should be understood that this disclosure may be implemented in various forms, and should not be construed as being limited to embodiments described herein. Rather, these embodiments are provided so that this disclosure will be thoroughly and completely understood. It should be understood that the accompanying drawings and embodiments of this disclosure are merely used as examples, but are not intended to limit the protection scope of this disclosure.

In descriptions of embodiments of this disclosure, the term "include" and similar terms thereof should be understood as indicating open inclusion, that is, "include but are not limited to". The term "based on" should be understood as "at least partially based on". The terms "one embodiment" or "the embodiment" should be understood as "at least one embodiment". The terms "first", "second", and the like may indicate different or same objects. Other explicit and implicit definitions may also be included below.

Embodiments of this disclosure may be implemented according to any appropriate communication protocol, including but not limited to cellular communication protocols such as the 4th generation (4G) and the 5th generation (5G), a wireless local area network communication protocol such as the Institute of Electrical and Electronics Engineers (IEEE) 802.11, and/or any other protocol currently known or developed in the future. Technical solutions in embodiments of this disclosure are applied to any appropriate communication system, for example, a general packet radio service (GPRS), a long term evolution (LTE) system, a frequency division duplex (FDD) system, a time division duplex (TDD) system, a universal mobile telecommunications system (UMTS), a narrowband internet of things (NB-IoT) communication system, a future 5th generation (5G) system, or a new radio (NR) system.

For a purpose of illustration, embodiments of this disclosure are described below in a context of a 5G 3rd generation partnership project (3GPP) communication system. However, it should be understood that embodiments of this disclosure are not limited to being applied to a 5G 3GPP communication system, but may be applied to any communication system having a similar problem, for example, a wireless local area network (WLAN), a wired communication system, or another communication system developed in the future.

The term "terminal device" used in this disclosure is any terminal device that can perform wired or wireless communication with a network device or with each other. The terminal device may be sometimes referred to as user equipment (UE). The terminal device may be any type of mobile terminal, fixed terminal, or portable terminal. As an example, the terminal device may include a mobile phone, a station, a unit, a device, a mobile terminal (MT), a subscription station (SS), a portable subscription station (PSS), an internet node, a communicator, a desktop computer, a laptop computer, a notebook computer, a tablet computer, a personal communication system (PCS) device, a personal navigation device, a personal digital assistant (PDA), a positioning device, a radio broadcast receiver, an e-book device, a gaming device, an internet of things (IoT) device, a vehicle-mounted device, an aircraft, a virtual reality (VR) device, an augmented reality (AR) device, a wearable device, a terminal device in a 5G network or any terminal device in a future evolved public land mobile network (PLMN), another device that can be used for communication, or any combination thereof. This is not limited in embodiments of this disclosure.

The term "access network device" used in this disclosure is an entity or a node that may be configured to communicate with the terminal device. The access network device may be, for example, a radio access network (RAN) device. The access network device may include various types of base stations. As an example, the access network device may include various forms of macro base stations, micro base stations, pico base stations, femto base stations, relay stations, access points, remote radio units (RRU), radio heads (RH), remote radio heads (RRH), and the like. In systems using different radio access technologies, a name of the access network device may vary. For example, the access network device is referred to as an evolved NodeB (eNB or eNodeB) in an LTE network, is referred to as a NodeB (NodeB) in a 3G network, and may be referred to as a gNodeB (gNB) or an NR NodeB (NR NB) in a 5G network. This is not limited in embodiments of this disclosure.

The term "core network device" or "CN device" used in this disclosure may be a network function (NF) or a network element in a core network. The core network device may include a control plane anchor of the terminal device, and provide functions such as core network access, registration area update, mobility management, and session management for the terminal. As an example, the core network device may include an access and mobility management function (AMF), a network slice selection function (NSSF), a network repository function (NRF), a session management function (SMF), a policy control function (PCF), a user plane function (UPF), and the like. In embodiments of this disclosure, the described functions of the core network may be implemented on one or more function entities of the core network.

Specific embodiments of this disclosure are mainly implemented in a network slice-based architecture. Before specific embodiments of this disclosure are described, for ease of understanding, an example network slice-based environment is first described, and some terms that may appear in this specification are described.

1. Example Network Slice-Based Environment

FIG. 1 is a schematic block diagram of a network slice-based communication environment 100 according to embodiments of this disclosure. As shown in the figure, on a single infrastructure pool 110, a plurality of network slices 120-1, 120-2, . . . , and 120-N (collectively referred to as or separately referred to as a network slice 120 in this specification for ease of discussion) may be virtualized, where N is an integer greater than 1. It should be understood that a quantity of network slices and infrastructures shown in FIG. 1 are merely examples.

The infrastructure pool 110 may include various physical or virtual network devices required to support a network service, such as various access network devices, servers, switches, and gateways. Network resources of the infrastructure pool 110 are allocated to different network slices 120 based on different service requirements, tenant requirements, or the like. Therefore, different types of network slices 120 provide different network capabilities and network features. A type of the network slice 120 is usually related to a to-be-supported service type, for example, may include a type such as an enhanced mobile broadband service (eMBB), ultra-reliable low-latency communication (URLLC), and massive machine-type communications (mMTC). In some embodiments, there may be a plurality of network slices 120 for each type.

In this specification, the network slice 120 may be understood as a complete end-to-end logical subnet including an access network, a transport network, a core network, and an application server, can provide a telecommunications service, and has a specific network capability. Alternatively, the network slice 120 may be any combination of the access network, the transport network, the core network, and the application server. For example, the network slice 120 may include only the access network and the core network. For a specific network slice 120, an access network may or may not support the network slice. The access network may be shared by a plurality of network slices 120. Different network slices 120 may have different features and include different network function modules. The network slice may also be briefly referred to as a "slice".

Figure 2:
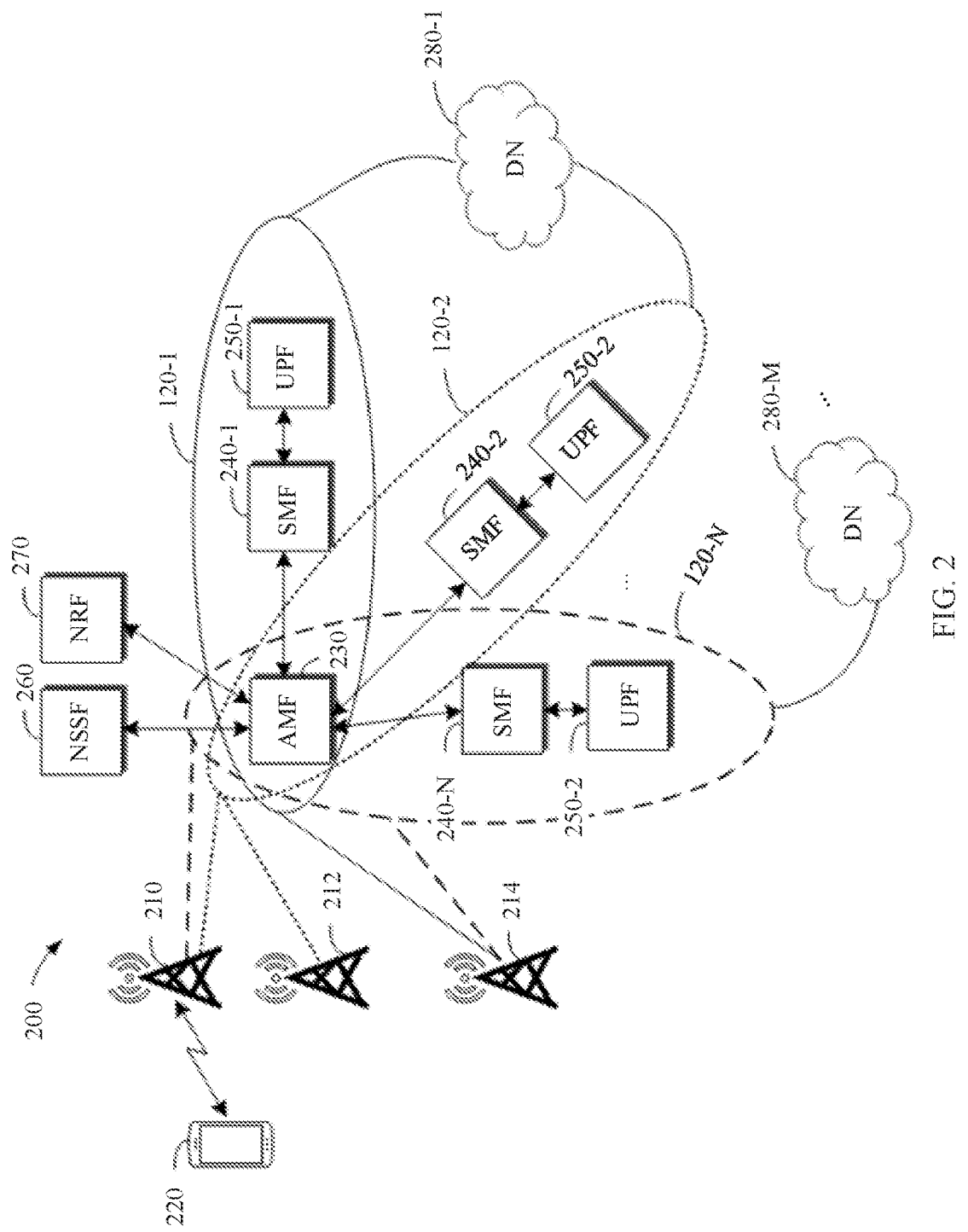
FIG. 2 is a schematic block diagram of an example network slice-based networking architecture according to embodiments of this disclosure.

FIG. 2 is a schematic diagram of an example network slice-based networking architecture 200 according to embodiments of this disclosure. In the example shown in FIG. 2, a plurality of access network devices 210, 212, 214, and the like are configured to implement a network function of an access network in a communication environment. Each access network device may support one or more network slices 120. For example, the access network device 210 supports network slices 120-2 and 120-N, which means that the network slices 120-2 and 120-N have a shared access network. FIG. 2 further shows that the access network device 212 supports the network slice 120-2, the access network device 214 supports the network slices 120-2 and 120-N, and so on.

FIG. 2 further shows a core network device for each network slice 120. An AMF 230 is shared by a plurality of network slices 120, to provide access and mobility management for the plurality of network slices 120. Each network slice 120 further has a respective core network device. For example, a network slice 120-1 has an SMF 240-1, a UPF 250-1, and the like, the network slice 120-2 has an SMF 240-2, a UPF 250-2, and the like, and the network slice 120-N has an SMF 240-N, a UPF 250-N, and the like. For ease of discussion, in this specification, the SMF 240-1, the SMF 240-2, . . . , and the SMF 240-N may be collectively referred to as or separately referred to as an SMF 240, and the UPF 250-1, the UPF 250-2, . . . , and the UPF 250-N may be collectively referred to as or separately referred to as a UPF 250. The SMF 240 and the UPF 250 may provide related services such as session management and a user plane function of a core network for the network slice 120 based on requirements of each network slice 120 in different aspects such as a latency, a bandwidth, and security.

Further, core network devices such as an NSSF 260 and an NRF 270 may be deployed by network (for example, by PLMN), to support a network slice selection function and a network repository function in the network. FIG. 2 merely schematically illustrates an NSSF and an NRF for a single PLMN.

A terminal device 220 may access the network slice 120 through the access network device. In a same network, for example, a same PLMN, the terminal device 220 may access only one network slice 120, or may access a plurality of network slices 120, to use different services provided by the plurality of network slices 120 at the same time. In the example in FIG. 2, it is assumed that the terminal device 220 accesses the network slice 120-2 through the access network device 210, to finally implement communication between the terminal device 220 and a data network (DN). Different network slices 120 may access different DNs. In the example of FIG. 2, the network slices 120-1 and 120-2 may access a DN 280-1, and the network slice 120-N may access a DN 280-M. For ease of discussion, in this specification, the DN 280-1, . . . , and the DN 280-M may be collectively referred to as or separately referred to as a DN 280.

It should be understood that FIG. 2 shows merely an example networking mode of a network slice. During actual application, there may be many other different networking modes. For example, different network slices may have respective AMFs. In addition, a device type, a quantity of devices, a connection mode between devices, and the like shown in FIG. 2 may all be changed. For example. FIG. 2 illustrates only some core network devices, but actually there may be more, fewer, or other types of core network devices. In addition, there may be more, fewer, or other access network devices, more terminal devices, and the like. Variants of these deployment modes can be implemented by a person skilled in the art. This is not limited in embodiments of this disclosure.

To distinguish between network slices of the terminal device, the access network device, and the core network device, different network slices 120 may be identified by using corresponding identification information. In some examples, a network slice identifier (or also referred to as a slice identifier) may include single network slice selection assistance information (S-NSSAI). The S-NSSAI may include at least slice type/service type (SST) information, to indicate a feature of a network slice and a service type served by the network slice. As a supplement to the SST, the S-NSSAI may further include slice differentiation information (SD), to further distinguish between a plurality of network slice instances that satisfy a same SST. The SD is optional.

There may be a plurality of classifications for network slice selection assistance information (NSSAI), namely, a set of pieces of S-NSSAI. These classifications indicate names of the NSSAI in different scenarios or conditions. The following briefly describes some example NSSAI and related information.

The NSSAI of the network slice 120 may include configured NSSAI (configured NSSAI), and may specifically have the following types:

Home PLMN (HPLMN) configured NSSAI: The home PLMN (HPLMN) configured NSSAI includes HPLMN S-NSSAI, which is also referred to as subscribed S-NSSAI. In a home network, for example, in an HPLMN, the terminal device 220 may access the network by using the HPLMN configured NSSAI.

Visited PLMN (VPLMN) configured NSSAI: In a visited network, for example, in a visited PLMN, the terminal device accesses the network by using the VPLMN configured NSSAI.

Default configured NSSAI: In a visited network, for example, in a visited PLMN, if the terminal device 220 does not have VPLMN configured NSSAI, the terminal device 220 may register with the network by using the default NSSAI. The default configured NSSAI is usually standard-defined S-NSSAI.

It should be noted that network access mentioned above means that the terminal device 220 constructs requested NSSAI (requested NSSAI) based on the configured NSSAI, to request to access a network slice 120. In different PLMNs, a same network slice 120 may have different identifiers (for example, different NSSAI).

Usually, a network slice selection policy (NSSP) obtained by the terminal device 220 includes a correspondence between a service session (for example, an application session) of the terminal device 220 and the HPLMN S-NS-SAI of the network slice 120 in the home network. In some embodiments, the terminal device may further obtain mapping information from the configured NSSAI to the HPLMN S-NSSAI, to assist the terminal device 220 in determining the configured NSSAI corresponding to the network slice 120 that is to be used to carry a service, to include new configured NSSAI in a subsequent registration request.

The NSSAI of the network slice 120 further includes the requested NSSAI. The requested NSSAI is constructed by the terminal device 220, to indicate, to a network side (an access network side and a core network side), the network slice 120 requested to be accessed. The requested NSSAI can be from the following parameters:

Default configured NSSAI (default configured NSSAI): If the terminal device 220 does not have any configured NSSAI or allowed NSSAI in a current PLMN, the terminal device may use the default configured NSSAI.

Configured NSSAI: The terminal device 220 may obtain, in the current PLMN, the configured NSSAI of the PLMN.

Allowed NSSAI (allowed NSSAI): The terminal device 220 may obtain, in the current PLMN, the allowed NSSAI of the PLMN.

Allowed NSSAI+configured NSSAI that is not included: The terminal device 220 has accessed the current PLMN and received the allowed NSSAI, and the terminal device 220 further needs to request new configured S-NSSAI in the PLMN.

The NSSAI of the network slice 120 further includes subscribed S-NSSAI, and may include:

Subscribed S-NSSAI (subscribed S-NSSAI): The subscribed S-NSSAI is subscriber subscribed S-NSSAI, namely, the HPLMN S-NSSAI. The subscribed S-NS-SAI may be a standard value, or a non-standard value defined in the HPLMN (where for example, a non-standard value S-NSSAI may be defined in the HPLMN, to identify a network slice that can support both eMBB and URLLC services.)

Default subscribed S-NSSAI (default Subscribed S-NS-SAI): According to a policy of a network operator, one or more identifiers of subscriber subscribed S-NSSAI may be set as default S-NSSAI. If the terminal device 220 does not carry any requested NSSAI during network access, a core network element (for example, an NSSF) determines, based on the default subscribed S-NSSAI, the network slice 120 that the terminal device 220 requests to access.

The NSSAI of the network slice 120 further includes the allowed NSSAI, to identify a network slice that is allowed to be used by the terminal device 220 in the network. The allowed NSSAI is valid in a registration area range of the terminal device 220. In other words, when a tracking area (TA) is allocated in the network, availability of the network slice 120 for the terminal device 220 needs to be considered. If a current serving network of the terminal device 220 is a visited network (for example, a VPLMN), mapping information from visited network allowed NSSAI to home network NSSAI (for example, VPLMN allowed NSSAI to HPLMN NSSAI) further needs to be provided for the terminal device 220, to indicate possible mapping of different NSSAI of a same network slice 120 in the visited network and a home network.

Similarly, because the NSSP includes only the correspondence between the service session (for example, the application session) of the terminal device 220 and the HPLMN S-NSSAI of the network slice 120 that carries the service, in some embodiments, the terminal device 220 may further obtain the mapping information from the allowed NSSAI to the HPLMN S-NSSAI, to assist the terminal device 220 in determining the allowed NSSAI based on the service, to be used for a subsequent session request of the service, for example, a protocol data unit (PDU) session request.

It should be understood that the NSSAI information provided above is merely an example of an identifier identifying the network slice 120. The identifier of the network slice 120 may additionally include or alternatively include other information. Other information identifying the network slice may include, for example, service type information, which indicates a specific service supported by the network slice 120; tenant information, which indicates information about a customer who creates or rents the network slice; user group information, which indicates grouping information obtained after users are grouped based on a feature, such as a user level, slice group information, which indicates grouping of network slices based on a feature, where for example, all network slices that can be accessed by the terminal device are used as a slice group, or the network slices may be grouped according to another standard; network slice instance information, which indicates an identifier and feature information of an instance created for the network slice, where for example, an identifier may be allocated to a network slice instance, to specifically indicate the network slice instance; and the like.

It should be understood that, in embodiments of this disclosure, the network slice may indicate the network slice by using at least one of the foregoing identification information. This is not limited in embodiments of this disclosure. If the terminal device, the access network device, or the core network device supports a plurality of network slices, identifiers of the network slices supported by the terminal device, the access network device, or the core network device may be indicated by different identifiers in a plurality of types of identification information.

To better understand how the terminal device performs data communication in the network slice-based communication environment, the following briefly describes, with reference to an example in FIG. 2, how the terminal device sets up service communication. It should be noted that the service of the terminal device 220 mentioned in this specification may be a session of the terminal device 220, for example, a PDU session, or may be a service flow, a radio bearer, or the like of the terminal device 220. In some embodiments below, an example in which a session is used as a service is mainly used for description.

Specifically, as mentioned above, the terminal device 220 usually has the correspondence between the session (for example, the application session) and the HPLMN S-NSSAI of the network slice 120 in the home network. The correspondence is usually included in the NSSP, and may be provided by the home network, for example, a core network device PCF (not shown in FIG. 2) in the HPLMN for the terminal device 220. An example of the NSSP is shown in Table 1 below.

TABLE 1

| Network slice selection policy (NSSP) | | |
|---|---|---|
| Rule | Application | Identifier of a network slice |
| Default rule | — | HPLMN S-NSSAI 1 |
| NSSP rule 1 | Application A | HPLMN S-NSSAI 1 |
| NSSP rule 2 | Application B | HPLMN S-NSSAI 2 |
| . . . | . . . | . . . |

Table 1 shows identifiers of network slices associated with applications of the terminal device 220 in the HPLMN. Depending on an application to which a to-be-initiated PDU session belongs, the terminal device 220 may determine an identifier of a to-be-accessed network slice in the HPLMN. Because a same network slice may have different identifiers in different networks, if the serving network of the terminal device 220 is the visited network instead of the home network when the PDU session request is initiated, an identifier of an associated network slice in the visited network may not be determined according to the NSSP. To resolve this problem, the terminal device 220 may further obtain the mapping information from the visited network allowed NSSAI to the home network NSSAI. An example of the mapping information is shown in Table 2 below.

TABLE 2

| Mapping information from the visited network allowed NSSAI to the home network NSSAI | |
|---|---|
| Home network NSSAI | Visited network allowed NSSAI |
| HPLMN S-NSSAI 1 | Allowed S-NSSAI 1 |
| HPLMN S-NSSAI 2 | Allowed S-NSSAI 1 |
| HPLMN S-NSSAI 3 | Allowed S-NSSAI 2 |
| . . . | . . . |

In FIG. 2, if the current serving network of the terminal device 220 is the visited network and the terminal device 220 needs to initiate a PDU session of the application B in the visited network, the terminal device 220 may determine, according to the NSSP in Table 1, that an identifier of a corresponding network slice in the home network is the HPLMN S-NSSAI 2. The terminal device 220 further determines, based on the mapping information in Table 2, that identification information of a network slice identified by the HPLMN S-NSSAI 2 in the visited network is the allowed S-NSSAI 1. After determining the identification information, the terminal device 220 includes the HPLMN S-NSSAI 2 and the allowed S-NSSAI 1 in a PDU session setup request. The PDU session setup request is transmitted to an access network device connected to the terminal device 220, and then transmitted to the core network device such as the AMF 230. On the access network side and the core network side, a type of a network slice that the terminal device 220 requests to access may be determined by using information carried in the request.

In response to the PDU session setup request from the terminal device 220, the AMF 230 provides the HPLMN S-NSSAI 2 and the allowed S-NSSAI 1 in the request for the NSSF 260 in the visited network. The NSSF 260 selects a network slice-specific NRF and a network slice instance (NSI) identifier (ID) for the AMF 230 based on at least these identifiers. The AMF 230 provides the HPLMN S-NSSAI 2, the allowed S-NSSAI 1, and the NSI ID to the corresponding NRF 270 to select the SMF 240 in which the network slice is located.

The foregoing example shows that identifiers of a same network slice in different networks are different. Therefore, a corresponding network slice needs to be correctly identified by using mapping information between the NSSP and identifiers of network slices in different networks. In some cases, re-mapping may be further implemented between different network slices. "Re-mapping" between network slices means that one network slice may be re-mapped to another network slice. In this way, a service (for example, a PDU session) carried on one network slice may be served by another network slice to which the network slice is re-mapped. In other words, a network resource of another network slice is used to implement a service of a previous network slice.

Re-mapping between network slices may be applied to a handover scenario. For example, the terminal device needs to be handed over from one access network device to another access network device, but the access network device to which the terminal device needs to be handed over does not support a network slice in which a current service of the terminal device is located. To ensure service continuity of the terminal device, another network slice may be selected through re-mapping between network slices to provide a service for the terminal device. Currently, in some solutions, a re-mapping relationship between network slices in a same network is provided for an access network device to which the terminal device is connected, to assist the access network device in performing re-mapping between network slices.

In addition to the handover scenario, re-mapping between network slices may also be performed in another communication scenario. In some examples, if service load on a network slice is excessively heavy, the access network device may alternatively transfer a service of the terminal device to another network slice through re-mapping, to implement load balancing of the network slice and provide expected quality of service for the terminal device.

It can be learned from the foregoing discussion that, considering differentiated factors such as different capabilities of supporting network slices in different networks and network slices that different terminal devices are allowed to access in different networks, in network slice-based communication, the access network device usually needs sufficient information to correctly identify a network slice used to support communication of the terminal device.

In some scenarios, there may be problems such as a communication latency and service interruption caused by insufficient indication of a relationship between network slices. For example, if the terminal device needs to be handed over from one network to another network, when processing a handover request of the terminal device, a target access network device in the target network may not be capable of identifying a network slice corresponding to a current PDU session of the terminal device, and cannot determine a network slice allowed by the terminal device in the target network (does not obtain information related to the allowed NSSAI). In this way, the access network device cannot process access control on the terminal device. This mainly occurs in a scenario in which the terminal device is handed over through an Xn interface between access network devices.

According to a current communication protocol, cross-network terminal device handover may be implemented through an N2 (control plane) interface between the access network device and the core network device. An AMF may determine, based on UE context information, of the terminal device, maintained in a core network, NSSAI information of the network slice allowed by the terminal device in the target network, and perform access control from the terminal device to the target access network device based on the information.

If the handover has been initiated through the Xn interface, because the target access network device does not have sufficient information to perform access control, the terminal device may be first allowed to be handed over to the target network, and then the terminal device is required to initiate tracking area update (TAU) or registration based on a condition, to obtain identification information of the network slice allowed by the terminal device in the target network. Then, the target access network device performs access control on the terminal device. A latency problem may be caused in this process. If it is determined that access of the terminal device cannot be allowed, the PDU session is rejected, and consequently service continuity of the terminal device is affected.

2. First Implementation of this Disclosure

According to example embodiments of this disclosure, an improved solution is provided, to support access control on a terminal device. Specifically, in some embodiments, a target access network device to be accessed by the terminal device obtains, from a core network device or a source access network device, information indicating a relationship between a plurality of network slices in different networks. The target access network device can perform access control from the terminal device to the target access network device based on the obtained information. According to the solution of this disclosure, the target access network device can perform access control on the terminal device during cross-network access, to reduce an access latency, reduce a service interruption problem caused by session rejection of the terminal device, and ensure service continuity of the terminal device.

Figure 3:
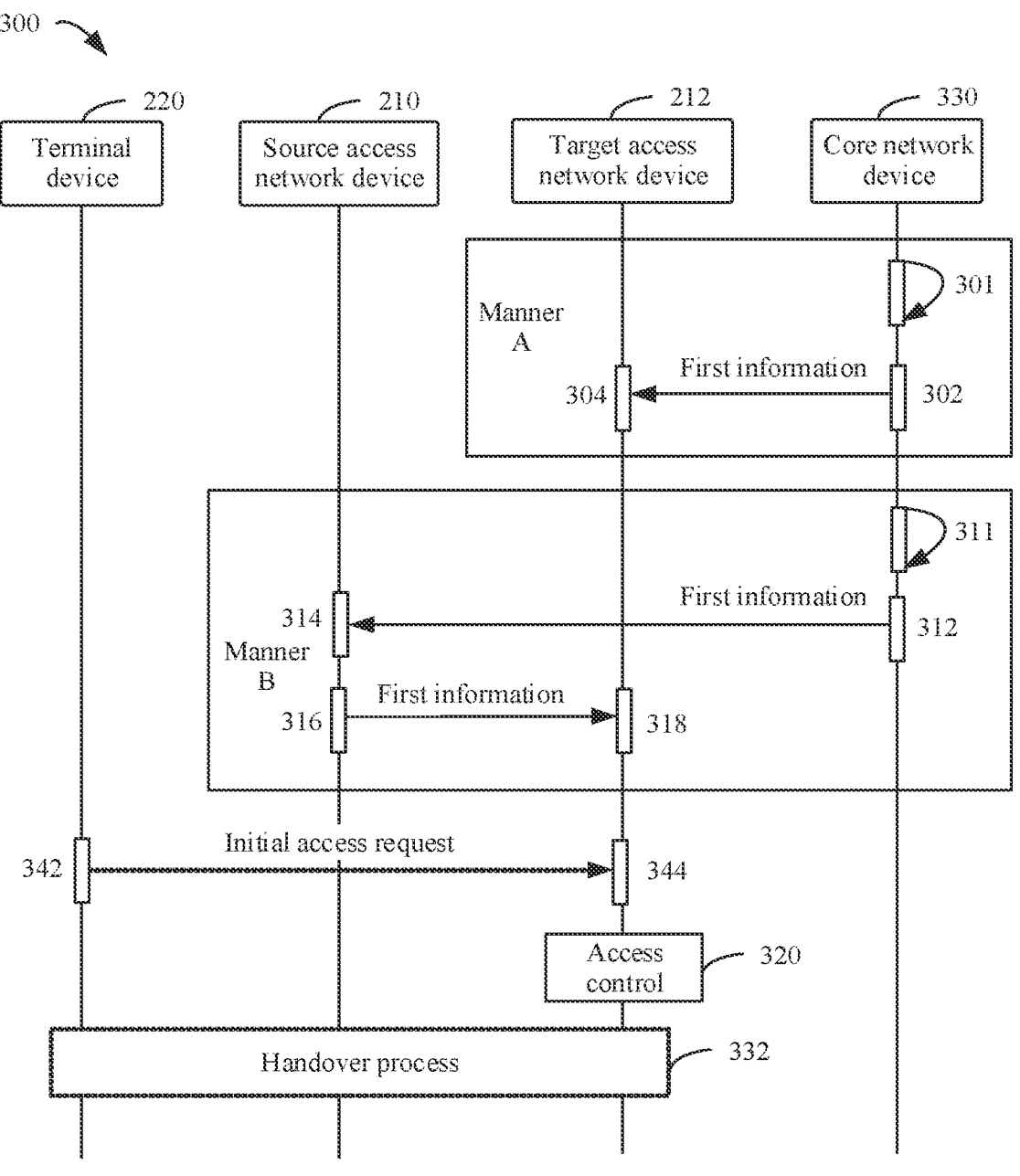
FIG. 3 is a signaling exchange diagram of a communication process according to some embodiments of this disclosure.
Figure 4:
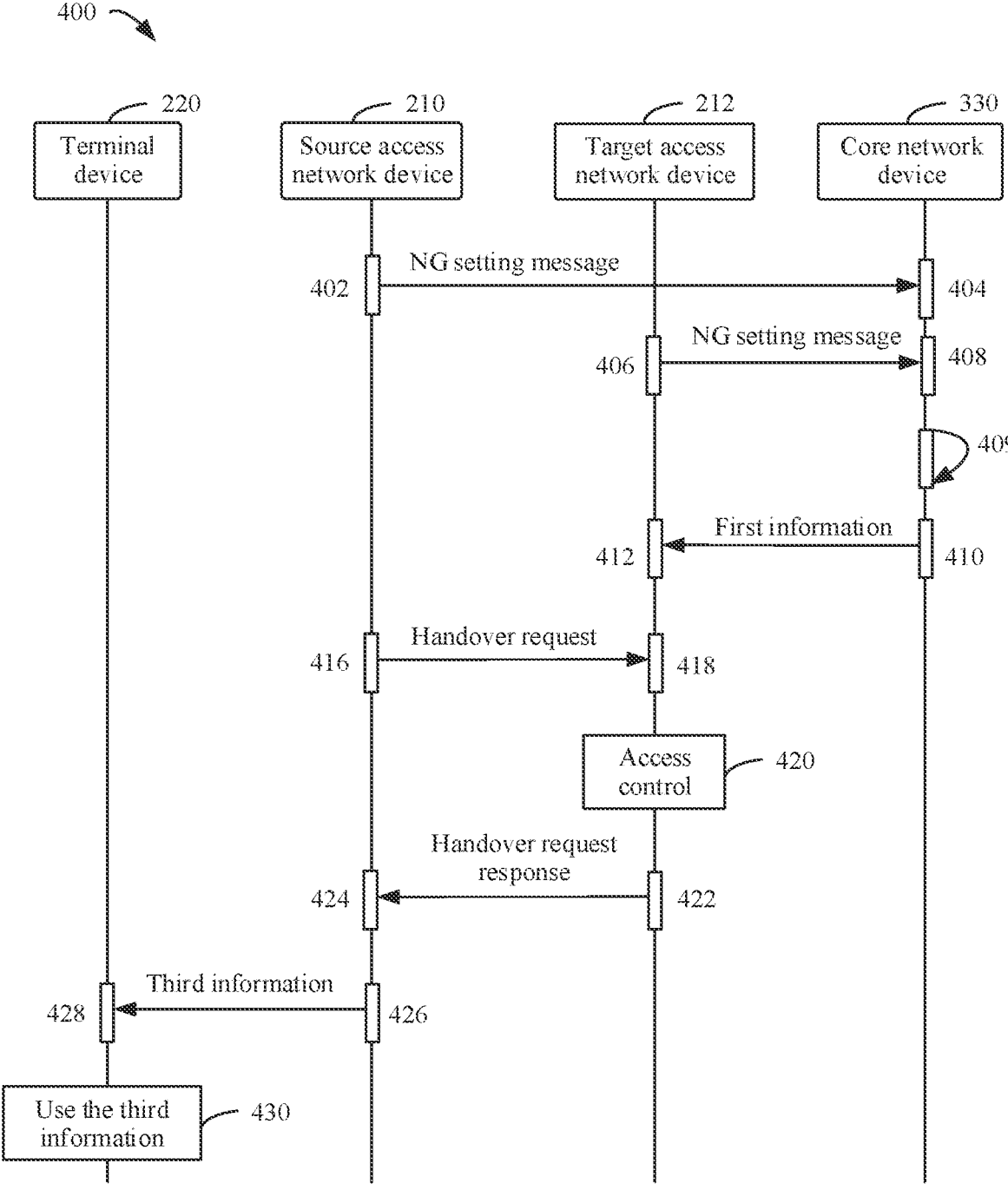
FIG. 4 is a signaling exchange diagram of a communication process according to some other embodiments of this disclosure.
Figure 5:
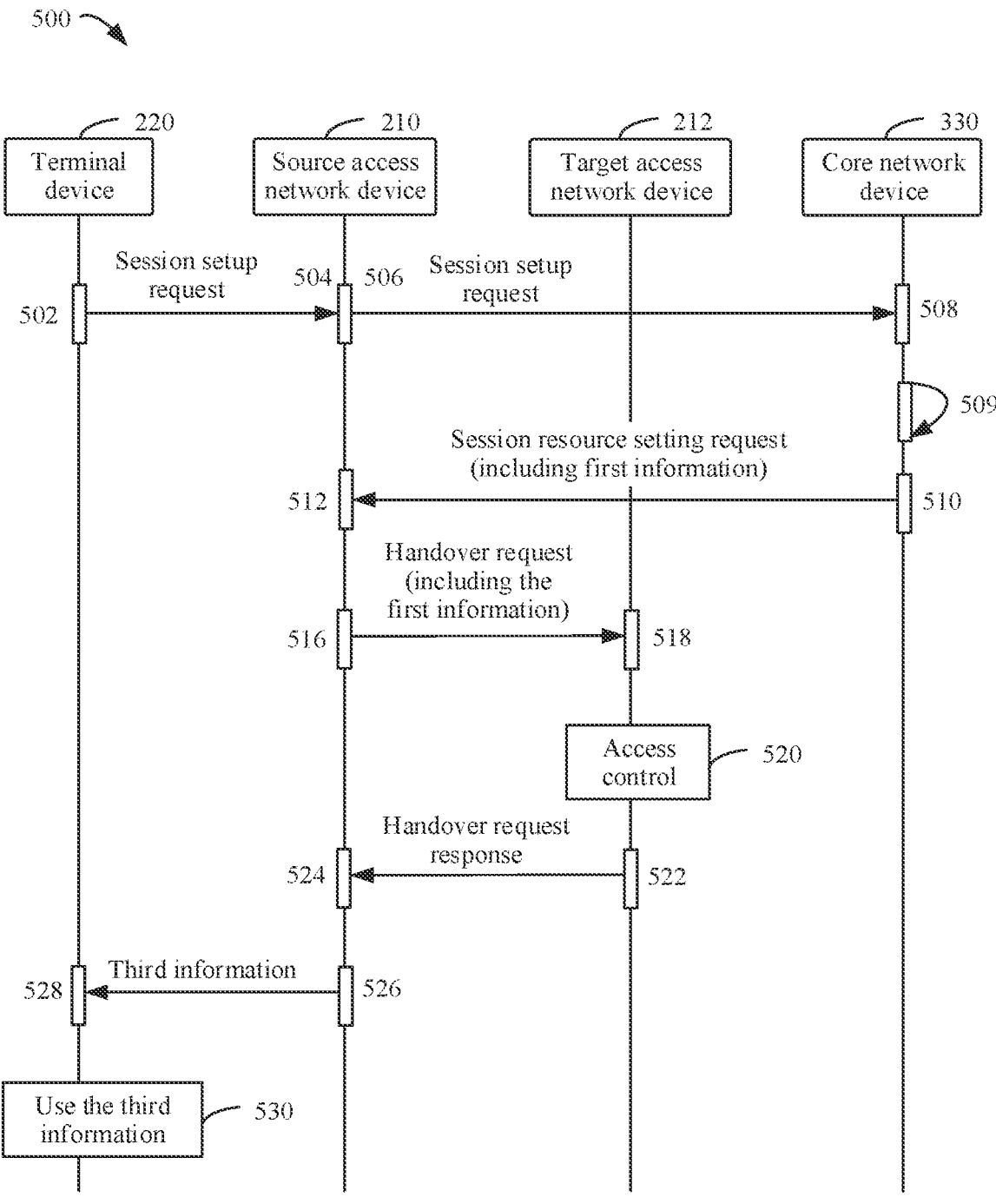
FIG. 5 is a signaling exchange diagram of a communication process according to still some embodiments of this disclosure.

The following discusses example embodiments of this disclosure in detail with reference to the accompanying drawings. When signaling exchange processes in FIG. 3 to FIG. 5 are described below, for ease of discussion, signaling exchange between communication entities according to example embodiments of this disclosure is described with reference to the example architecture in FIG. 2. It should be understood that example embodiments of this disclosure may be similarly applied to another network slice-based communication environment and another network slice-based networking architecture. In the following, a network slice is the network slice 120 in FIG. 2.

Signaling exchange in FIG. 3 to FIG. 5 relates to a target access network device of the terminal device 220, relates to a core network device in some implementations, and relates to a source access network device of the terminal device 220 in some other implementations. In this specification, the target access network device is a physical or virtual access network device to be accessed by the terminal device 220. The terminal device 220 currently may have been connected to another network device or is performing initial registration access to the target access network device.

In this specification, the source access network device is a physical or virtual access network device to which the terminal device 220 currently has been connected. The terminal device 220 may access a network handover service of a source network (for example, access a network slice in the serving network) through the source access network device. If the terminal device 220 is being served by the source network, the source network is referred to as a serving network of the terminal device 220. In the following, for a purpose of discussion, it is assumed that the access network device 210 in FIG. 2 is the source access network device currently connected to the terminal device 220, and the access network device 212 is the target access network device of the terminal device 220.

In some cases, if the terminal device 220 needs to be handed over from a current serving network to another network, for example, a network accessed through the target access network device, the network may be referred to as a target network of the terminal device 220. If the target access network device 212 determines to allow the terminal device 220 to access a network slice in the target network, after the handover is completed, the target network is changed to a serving network of the terminal device 220.

In this specification, the core network device is a physical or virtual device that implements a related function on a core network side. The core network device may be the AMF 230 that can be directly connected to the access network device, or may be a generic term of the AMF 230 and one or more other network functions in a core network. For ease of discussion in the following, the core network device is uniformly identified as a core network device 330.

2.1 Overall Signaling Exchange

FIG. 3 is a signaling exchange diagram of a communication process 300 according to some embodiments of this disclosure. In the embodiment in FIG. 3, information (referred to as "first information" in this specification) indicating a relationship between network slices in different networks needs to be provided to the target access network device 212. The first information specifically indicates a relationship between one or more network slices in one or more first networks and one or more network slices in one or more second networks. Herein, the first network and the second network are different networks. In some embodiments, the first network and the second network may be different PLMNs, and the different PLMNs may be deployed by different network operators. In some embodiments, the first network and the second network may alternatively be other types of networks. Each network slice in the first network is sometimes referred to as a first network slice in this specification, and each network slice in the second network is sometimes referred to as a second network slice in this specification. All network slices indicated in the first information are network slices respectively supported in the first network and the second network.

In some embodiments, if the first information indicates a relationship between a first network slice in the first network and a second network slice in the second network, it means that a service of the terminal device 220 may be changed from corresponding to the first network slice to corresponding to the second network slice. In other words, a correspondence between a service of the terminal device 220 and a network slice may be changed between the first network slice and the second network slice. In this case, the second network slice may provide basically the same quality of service (QoS) as that of the first network slice, or may provide lower or higher QoS than that of the first network slice, but QoS reduction or improvement is in a tolerable range. In some examples, the relationship indicated by the first information may be a re-mapping relationship from the first network slice in the first network to the second network slice in the second network. The re-mapping relationship indicates that a service of the terminal device 220 on the first network slice in the first network may be re-mapped to the second network slice in the second network, so that the second network slice provides a communication service. In such an example, the first information may also be referred to as re-mapping policy information, and specifically indicates how to perform re-mapping between network slices in different networks. In this embodiment of this disclosure, the first information indicating a relationship between network slices in different networks helps the target access network device 212 perform access control on the terminal device 220, especially when the terminal device 220 is handed over between different networks.

In some embodiments, the first information may include an identifier of the first network, an identifier of the first network slice, an identifier of the second network, and an identifier of the second network slice. Identifiers of networks are also sometimes referred to as network identifiers, and are used to uniquely identify different networks. Identifiers of network slices are also sometimes referred to as slice identifiers, and are used to identify different network slices in corresponding networks. Different networks may support a same network slice, but identifiers of a same network slice in different networks may be the same or different. In the first information, an identifier of a network and an identifier of a slice may be used to indicate a relationship between the corresponding network and the network slice in the network.

If the first network and the second network are PLMNs, the identifiers of the first network and the second network may include, for example, respective PLMN identifiers (PLMN IDs) of the first network and the second network. Certainly, the identifier of the network may further include or alternatively include other information that helps identify a specific network, for example, a name of a network operator. In different networks, identifiers of network slices may include respective S-NSSAI. Certainly, in addition to the S-NSSAI or as an alternative, the identifier of the network slice may further include other information that helps identify a specific network slice.

The first information may be provided to the target access network device 212 in a plurality of manners. In different manners, the first network and the second network related to the first information and the network slices in the first network and the second network may be different. The following lists two possible manners, including a manner A and a manner B.

As shown in FIG. 3, in the manner A, the core network device 330 determines the first information in 301, where the first information indicates a relationship between one or more network slices in one or more first networks and one or more network slices in one or more second networks.

In some embodiments of the manner A, the core network device 330 may receive network slice information from a plurality of access network devices (for example, the plurality of access network devices 210, 212, and 214 in FIG. 2). The network slice information indicates one or more networks (for example, PLMNs) supported by each access network device and one or more network slices supported in each network. In some embodiments, the plurality of access network devices may send the network slice information to the core network device 330 such as the AMF 230 in an N2 interface setup process. In some embodiments, the access network device transmits a supported network and a supported network slice to the core network device 330 by using an NG setup message. The core network device 330 includes the AMF 230 and another network function of the core network. After receiving the network slice information sent by the plurality of access network devices, the core network device 330 may determine the first information based on the network slice information. In some embodiments, the core network device 330 may determine, with reference to policy information, of each network, maintained on a core network side, a relationship between network slices, in each network, indicated by the network slice information, for example, determine whether these network slices are equivalent to each other and whether these network slices can be re-mapped, to determine the to-be-sent first information.

In addition to reporting the information about the supported network slice through the access network device, the core network device 330 may alternatively determine the first information in another manner. In some embodiments, the first information may be preconfigured in the core network device 330. For example, the first information is preconfigured in the core network device 330 in an initial phase of network deployment. How the core network device 330 obtains the first information is not limited in this embodiment of this disclosure.

In some embodiments of the manner A, the first network indicated by the first information may include one or more networks in a TA range, and the second network may include one or more networks in a same TA range. A set of first networks and a set of second networks may overlap. However, for a first network, the first information may indicate a relationship between one or more first network slices in the first network and network slices in different second networks. Because the first information covers a relationship between network slices in networks in a specific area, regardless of whether the terminal device needs to access any network in the area a corresponding target access network device can perform access control based on the first information.

In the manner A, the core network device 330 transmits the first information determined in 302 to the target access network device 212, and the target access network device 212 receives the first information from the core network device 330 in 304. In some embodiments, the first information is included in an NG setup response transmitted to the target access network device 212, and the NG setup response is a response to the NG setup message sent by the target access network device 212. In this manner, the target access network device 212 may obtain, in advance in an interface setup phase, the first information used for access control. Certainly, the core network device 330 may alternatively transmit the first information in another message or other signaling for communicating with the target access network device 212, or transmit the first information by using dedicated signaling.

Transmission of the first information by the core network device 330 may be extensive. In some embodiments, the core network device 330 may send the first information to a plurality of access network devices in a specific TA range, and the target access network device 212 is one of the plurality of access network devices. In some embodiments, the core network device 330, for example, the AMF 230, may send the first information to the target access network device 212 by using any type of signaling through an interface with the target access network device 212.

In some embodiments of the manner A, a possible form of the first information is given in the following Table 3.

TABLE 3

| Example form of the first information | |
|---|---|
| First information | Description |
| >PLMN list: | Information about the first network (using a PLMN network as an example) |
| >>PLMN ID | PLMN ID of each first network |
| >>Supported NSSAI: | Network slice supported by each first network |
| >>>S-NSSAI | Listing identifiers of network slices in the first network (using S-NSSAI as an example) |
| >>>Re-mapping PLMN list: | Information about the second network in which a network slice to which each network slice in the first network can be re-mapped is located |
| >>>>PLMN ID | PLMN ID of each second network |
| >>>>Re-mapping NSSAI: | Listing network slices that can be re-mapped in each second network |
| >>>>>S-NSSAI | Listing identifiers of network slices that can be re-mapped in the second network (using S-NSSAI as an example) |

By using the example first information in Table 3, the target access network device 212 may determine a relationship between each network slice in each first network and each network slice in each second network slice. It should be understood that Table 3 shows only one possible representation form of the first information. During actual application, the first information may alternatively be represented in any other manner.

In the embodiment of the manner A, when determining the first information, the core network device 330 may not consider whether a relationship between network slices is applicable to a specific terminal device 220, but assumes that different terminal devices 220 have a same re-mapping policy for network slices in the first network and the second network. The first information may be sometimes referred to as common first information, common re-mapping policy information, or re-mapping policy information not associated with the terminal device.

If network slices allowed by different terminal devices in different networks are different, in some embodiments of the manner A, the source access network device 210 may send additional information (referred to as "second information" in this specification) to the target access network device 212. The second information may indicate an identifier of a network slice that is allowed to be used by the terminal device 220 in different networks. The networks herein include the second network indicated by the first information. The second information may be used to further assist the target access network device 212 in performing access control, for example, enable the target access network device 212 to determine specific network slices that are allowed to be accessed by the terminal device 220 in the second network.

For each second network, the network slice indicated by the second information and the network slice indicated by the first information may not be completely the same, but partially overlap. For example, in comparison with the network slice indicated by the first information, the second information may indicate that fewer network slices in the second network are allowed to be accessed by the terminal device 220. The network slice, in the second network, indicated by the second information is sometimes referred to as a "third network slice" in this specification, to distinguish from the second network slice indicated by the first information. However, the second network slice may include or partially include the third network slice.

In some embodiments, a possible form of the second information is given in the following Table 4.

TABLE 4

| Example form of the second information | |
|---|---|
| Second information | Description |
| >PLMN list: | Information about the second network (using a PLMN network as an example) |
| >>PLMN ID | PLMN ID of each second network |
| >>Allowed NSSAI: | Network slice allowed to be used by the terminal device 220 in each second network |
| >>>S-NSSAI | Identifier of the allowed network slice (using S-NSSAI as an example) |

It should be understood that Table 4 shows only one possible representation form of the second information. During actual application, the second information may alternatively be represented in any other manner.

In some embodiments, the source access network device 210 may receive the second information for the terminal device 220 from the core network device 330. In an example, the second information may be used as UE context information of the terminal device 220, and is provided by the core network device 330 for the source access network device 210. The source access network device 210 may alternatively obtain the second information in another manner and provide the second information for the target access network device 212.

In some embodiments, the source access network device 210 may send the second information to the target access network device 212 when determining to hand over the terminal device 220 from a current serving network to a target network supported by the target access network device 212. For example, if handover for the terminal device 220 is triggered, the source access network device 210 sends a handover request to the target access network device 212, and includes the second information in the handover request. Certainly, the core network device 330 may alternatively include the second information in another type of message or signaling for communicating with the target access network device 212, or transmit the second information by using dedicated signaling.

In addition to the manner A, the first information may alternatively be provided to the target access network device 212 in another manner (namely, the manner B). As shown in FIG. 3, in the manner B, the core network device 330 determines the first information in 311 and sends the first information in 312 to the source access network device 210 of the terminal device 220. Therefore, the source access network device 210 receives the first information from the core network device 330 in 314, and sends a part or all of the received first information to the target access network device 212 in 316. In this way, the target access network device 212 receives the first information from the source access network device 210 in 318.

In the embodiment of the manner B, slice-related information specific to the terminal device 220 is expected to be provided to the target access network device 212. In comparison with the manner A, in the manner B, the first network indicated by the first information that is sent by the core network device 330 to the source access network device 210 is specifically a serving network of the terminal device 220, rather than any network in a specific area. Because the first information is specific to the terminal device 220, the target access network device 212 can directly use the information to perform access control on the terminal device 220. In addition, because the first information carries a smaller amount of information, overheads of information transmission between devices are reduced.

When determining the first information specific to the terminal device 220, the core network device 330 may determine a current serving network of the terminal device 220 through the source access network device 210 to which the terminal device 220 is currently connected. Specifically, when performing communication in the serving network, the terminal device 220 usually initiates a session setup request to a core network through the source access network device 230, where the session setup request carries an identifier of the serving network of the terminal device 220. The source access network device 230 forwards the session setup request of the terminal device 220 to the core network device 330. Correspondingly, the core network device 330 may determine the serving network of the terminal device 220 from the received session setup request, and further determine that the first information sent to the source access network device 210 indicates only a relationship between one or more network slices in the serving network and one or more network slices in the second network.

In some embodiments, when determining the first information specific to the terminal device 220, the core network device 330 may further determine a specific network slice, in the serving network, serving a current session of the terminal device 220. For example, the session setup request from the source access device 210 may further include an identifier of a network slice that the terminal device 220 requests to access for a session that is to be set up. If the core network device 330 determines that the terminal device 220 is allowed to access the network slice, correspondingly, the core network device 330 may determine to indicate, in the first information, a relationship between the network slice in the serving network and the one or more network slices in the second network, for example, a re-mapping relationship between these network slices.

Therefore, in some embodiments of the manner B, the network slice in the service network related to the first information may be only a network slice currently accessed by the terminal device 220, or may further include one or more other network slices, in the serving network, that are determined by the core network device 330 and that can be allowed to be accessed by the terminal device 220 to serve the current service. This can further reduce an information amount of the first information, so that the first information is more suitable for access control on the terminal device 220 in a current communication condition. In addition, overheads required for transmitting the first information are lower.

In some embodiments of the manner B, the core network device 330 may alternatively determine the first information based on one or more network slices allowed by the terminal device 220 in the second network, so that the second network and the second network slice related to the first information are allowed to be used by the terminal device 220. In these embodiments, the first information provided by the core network device 330 indicates a relationship between the network slice in the serving network and the one or more network slices that are allowed to be used by the terminal device 220 in the second network.

In some embodiments of the manner B, for the current service of the terminal device 220, for example, a current PDU session, a possible form is provided in the following Table 5.

TABLE 5

| Example form of the first information | |
|---|---|
| First information | Description |
| >PLMN list: | Information about the second network |
| >>PLMN ID | PLMN ID of each second network |
| >>Re-mapping NSSAI: | Listing network slices in the serving network that can be re-mapped in each second network |
| >>>S-NSSAI | Listing identifiers of network slices that can be re-mapped in the second network (using S-NSSAI as an example) |

It should be understood that Table 5 shows only one possible representation form of the first information. During actual application, the first information may alternatively be represented in any other manner.

In some embodiments of the manner B, when transmitting the first information, the core network device 330 may transmit the first information to the source access network device 210 in a session resource setup request for the session setup request. Certainly, the core network device 330 may alternatively send the first information in another message or other signaling for communicating with the source access network device 210, or transmit the first information by using dedicated signaling.

In some embodiments of the manner B, after receiving the first information from the core network device 330, the source access network device 210 may forward the first information to the target access network device 212. In these embodiments, the one or more second networks indicated by the first information received from the core network device 330 include a target network supported by the target access network device 212. In some embodiments, the source access network device 210 may send the first information to the target access network device 212 when determining to hand over the terminal device 220 from a current serving network to a target network supported by the target access network device 212. For example, if handover for the terminal device 220 is triggered, the source access network device 210 sends a handover request to the target access network device 212, and includes the first information in the handover request.

In some embodiments, the source access network device 210 may not directly forward all content of the first information received from the core network device 330, but send, to the target access network device 212 depending on a target network to which the terminal device 220 is to be handed over, a part of information related to the target network to which the terminal device 220 is to be handed over. In other words, the first information sent by the source access network device 210 to the target access network device 212 may indicate a relationship between the network slice in the serving network and a network slice in the target network to which the terminal device 220 is to be handed over. Therefore, overheads of transmission between access network devices can be reduced, so that the target access network device 212 does not need to receive useless information.

In the embodiment of the manner B, because the first information is related to the serving network of the terminal device 220, and is further related to the target network of the terminal device 220 in some embodiments, the first information may be sometimes referred to as first information specific to the terminal device 220 or re-mapping policy information specific to the terminal device 220.

Several manners of obtaining the first information by the target access network device 212 are discussed above. After obtaining the first information, the target access network device 212 performs access control from the terminal device 220 to the target access network device 212 in 320 based on the first information. The access control may include various operations related to access of the terminal device 220, to determine whether the terminal device 220 can access the target network supported by the target access network device 212, for example, a target PLMN. In some cases, the access control is sometimes referred to as "admission control".

The target access network device 212 may trigger access control on the terminal device 220 due to various factors. In some embodiments, if the terminal device 220 is being served by a source network supported by the source access network device 210, but needs to be handed over from the current serving network to the target network, the target access network device 212 needs to perform access control. In some examples, the target access network device 212 receives the handover request from the source access network device 210, to request to hand over the terminal device 220 from the current serving network to the target network. After receiving the handover request, the target access network device 212 performs access control on the terminal device 220.

In a handover scenario, when performing access control, the target access network device 212 may determine an identifier (sometimes referred to as a "serving network identifier") of the serving network of the terminal device 220, an identifier (referred to as a "serving slice identifier") of a serving network slice accessed by the terminal device 220 in the serving network, and an identifier (referred to as a "target network identifier") of the target network to which the terminal device 220 is to be handed over. The identifiers of these networks and network slices may be carried in the handover request from the source access network device 210. For example, the handover request includes an identifier of a network slice corresponding to a current PDU session of the terminal device 220, and the identifier indicates the serving network slice in the serving network. The handover request also includes a mobility constraint list, indicating the identifier of the target network to which the handover is to be performed. Certainly, in addition to the foregoing information, the slice request may optionally include other information. This is not limited in this aspect in this embodiment of this disclosure.

Based on the network and the identifier of the network slice, the target access network device 212 may determine, from the obtained first information, a network slice (referred to as a "target network slice") that is in the target network and that has a relationship with the serving network slice. In an embodiment, the target access network device 212 may determine, based on the first information, whether the service of the terminal device 220 can be changed from corresponding to the serving network slice to corresponding to the target network slice, for example, whether the service of the terminal device 220 can be re-mapped from the serving network slice to the target network slice.

For example, the target access network device 212 determines, from the handover request, that the identifier of the serving network corresponding to the PDU session of the terminal device 220 is "V1" and the identifier of the serving network slice is "S-NSSAI 1", and further determines that the identifier of the target network is "V2". By using the identifiers of these networks and the identifiers of these service slices, the target access network device 212 finds, from the first information, that the service network slice S-NSSAI 1 in the serving network V1 may be re-mapped to one or more target network slices in the target network V2, for example, target network slices identified by identifiers S-NSSAI 1' and S-NSSAI 2'.

In consideration of that network slices allowed by the terminal device 220 in different networks may be different, if the first information used by the target access network device 212 is the common first information received from the core network device 330 in the manner A, as mentioned in some embodiments above, the target access network device 212 may further receive additional second information from the source access network device 210. The second information indicates specific network slices in one or more network slices in the second network are allowed to be accessed by the terminal device 220. The target access network device 212 may determine, from the second information by using the identifier V2 of the target network, one or more target network slices allowed to be used by the terminal device 220 in the target network. The target access network device 212 may obtain an intersection set of results of target network slices determined from the first information and the second information, to determine a target network slice that can be re-mapped to the current serving network slice and that is further allowed to be used by the terminal device 220.

If the first information is the first information that is specific to the terminal device 220 and that is received in the manner B, the one or more target network slices determined by the target access network device 212 from the first information is already the network slice allowed to be used by the terminal device 220 by default.

After determining the one or more target network slices, the target access network device 212 may determine, based on the determined target network slice, whether access of the terminal device 220 can be allowed. For example, the target access network device 212 may determine whether the target access network device 212 can provide access to the target network slice S-NSSAI 1' and/or the target network slice S-NSSAI 2' for the terminal device 220, and whether the target access network device 212 needs to perform re-mapping from the serving network slice S-NSSAI 1 to the target network slice S-NSSAI 1' and/or the target network slice S-NSSAI 2'. Access control performed by the target access network device 212 on the terminal device 220 depends on a specific access control policy of the target access network device 212. This is not limited in this aspect in this embodiment of this disclosure.

In some embodiments, a subsequent handover process in 332 is performed between the terminal device 220, the source access device 210, and the target access network device 212 based on a result of access control performed by the target access network device 212. The subsequent handover process in 332 is performed depending on a specific communication requirement. This is not limited in this aspect in this embodiment of this disclosure.

In some embodiments related to handover, the terminal device 220 currently accesses a network slice in the serving network through the source access network device 210, to obtain a communication service of the network slice. In some embodiments, the current serving network of the terminal device 220 may be a visited network of the terminal device 220. In other words, the terminal device 220 is roaming. In another embodiment, the current serving network of the terminal device 220 may alternatively be a home network of the terminal device 220. In some embodiments, a target network to be accessed by the terminal device 220 through the target access network device 212 is another visited network of the terminal device 220.

The foregoing describes only a specific example in which the target access network device 212 performs access control in the handover scenario. The access control process may further include other different operations, more operations, or some of the foregoing operations may be omitted. Regardless of a policy used by the target access network device 212 to perform access control, the first information indicating the relationship between network slices in different networks helps the target access network device 212 complete the access control process in different conditions.

In addition to the handover scenario, in another example, the target access network device 212 may alternatively trigger access control on the terminal device 220 by using another event. In an example, the target access network device 212 may control initial access of the terminal device 220 by using the first information. As shown in FIG. 3, the terminal device 220 sends an initial access request in 342 to the target access network device 212, to request to register with the target network. After receiving the initial access request in 344, the target access network device 212 may perform access control in 320 based on the first information. For example, based on the first information, the target access network device 212 may determine whether the terminal device 220 is allowed to access the target network and how to implement access of the terminal device 220, for example, determine a specific network slice in the target network to be accessed.

Some embodiments of this disclosure are discussed above. In these embodiments, with the help of the first information, the target access network device can timely complete access control of the terminal device, especially access control in a case of cross-network handover. This avoids a latency in cross-network handover, reduces a possibility of service interruption of the terminal device, and ensures service continuity of the terminal device.

Refer to FIG. 3. The foregoing describes a process used to support the target access network device in performing access control on the terminal device according to some embodiments of this disclosure. FIG. 4 and FIG. 5 below respectively show specific implementations of signaling exchange between communication entities in the manner A and the manner B in FIG. 3. The implementations of FIG. 4 and FIG. 5 relate to a scenario in which the terminal device 220 is handed over between different networks, and some messages/signaling may have been mentioned above as example embodiments. It should be understood that FIG. 4 and FIG. 5 are merely intended to explain and describe some specific implementations related to the signaling exchange process shown in FIG. 3, and there may be many other variations in the signaling exchange process shown in FIG. 3.

2.2 Example Implementation Based on the Manner A

FIG. 4 is a signaling diagram of a communication process 400 of each communication entity in the embodiment of the manner A in FIG. 3. The source access network device 210 transmits the NG setup message in 402 to the core network device 330, and the target access network device 212 also transmits the NG setup message in 406 to the core network device 330. Therefore, the core network device 330 receives the NG setup message from the source access network device 210 in 404 and the NG setup message from the target access network device 212 in 408. It should be noted that when the NG setup message is transmitted, the terminal device 220 may not have accessed the serving network or may have accessed the serving network through the source access network device 210, and may not have been triggered or may have been triggered to hand over from the serving network to the target network.

Each NG setup message includes network slice information, and the network slice information indicates a network supported by the source access network device 210 or the target access network device 212 in a TA range and a network slice supported by the source access network device 210 or the target access network device 212. For example, each NG setup message includes a TA range identified by a TA code (TAC) and network information in the TA range. The network information includes an identifier of one or more networks, for example, a PLMN ID. In addition, each NG setup message further includes information about a network slice supported by each network in a current TA range, which is also referred to as TA identifier (TAI) slice support information. The network slice information includes an identifier of one or more supported network slices, for example, S-NSSAI.

Although not shown, in addition to the source access network device 210 and the target access network device 212, the core network device 330 may alternatively receive the NG setup message from another access network device, to determine a network and a network slice supported in a corresponding TA range. Certainly, in addition to the NG setup message, the core network device 330 may further learn of, by using another message or other signaling, network slices supported in different networks.

The core network device 330 determines, based on network slice information, of each network, received from the access network device, and possibly further based on policy information, of each network, maintained on a core network side, the first information to be provided to the access network device in 409. The first information includes, for example, the information discussed above with reference to the manner A in FIG. 3.

It should be noted that although FIG. 4 shows an example embodiment in which the core network device 330 determines the first information based on the network slice information reported by the access network device, as mentioned above, in another embodiment, the first information may be preconfigured for the core network device 330. In an embodiment in which the first information is preconfigured, the core network device 330 may not need to receive the network slice information from the access network device.

After determining the first information, the core network device 330 transmits the first information in 410 to the target access network device 212. In some embodiments, the core network device 330 may send the first information to a plurality of access network devices in a same TA range. For example, the first information may be included in the NG setup response.

The target access network device 212 receives the first information from the core network device 330 in 412, so that the first information can be subsequently used to perform access control. An example in FIG. 4 illustrates access control in a handover scenario. Specifically, if the source access network device 210 determines to initiate handover for the terminal device 220, for example, determines to hand over the terminal device 220 from the current serving network (namely, the first network) to a different target network (namely, the second network), the source access network device 210 transmits the handover request in 416 to the target access network device 212.

For example, the handover request may include a list of resources of PDU sessions that are to be set up, including a current PDU session ID of the terminal device 220, and an identifier of a serving network and an identifier of a serving network slice that correspond to each PDU session. The handover request may also include a mobility constraint list, indicating the identifier of the target network to which the handover is to be performed. In some embodiments, the handover request further includes the second information discussed above, and the second information indicates an identifier of one or more network slices that are allowed to be used by the terminal device 220 in the second network.

In response to receiving the handover request from the source access network device 210 in 418, the target access network device 212 performs access control from the terminal device 220 to the target access network device 212 in 420. Some embodiments of access control performed by the target access network device 212 are discussed above with reference to FIG. 3, and are not described herein again.

In the example in FIG. 4, it is assumed that the target access network device 212 determines to allow the terminal device 220 to access the target network. The target access network device 212 transmits a handover request response in 422 to the source access network device 210, where the response indicates that the handover request succeeds; and allows the terminal device 220 to be handed over from the current serving network to the target network.

In some embodiments, the target access network device 212 may further determine to re-map a PDU session of the terminal device 220 from a serving network slice (for example, identified by NSSAI 1) in the current serving network (for example, identified by V1) to a target network slice (for example, identified by NSSAI 2') in the target network (for example, identified by V2). For example, the identifier of the target network slice may be carried in the handover request response.

After receiving the handover request response from the target access network device 212 in 424, the source access network device 210 transmits information in 426 to the terminal device 220, to indicate the serving network of the terminal device 220 to be handed over from the current network to another different network, namely, the target network. The information is referred to as "third information" in this specification. Therefore, the terminal device 220 may quickly learn of a handover success and the target network to which the terminal device 220 is to be handed over. In some examples, the third information may include the identifier of the target network to which the terminal device is handed over. In some embodiments, the third information may be included in a radio resource control (RRC) reconfiguration message (for example, an RRC Reconfiguration message) transmitted by the source access network device 210 to the terminal device 220.

After receiving the third information in 428, the terminal device 220 uses the third information in 430. The third information may have a plurality of functions for the terminal device 220. In some embodiments, because transmission of the third information means that the target access network device 212 determines to allow handover of the terminal device 220, the terminal device 220 may perform random access to the target access network device in the target network. In this case, the terminal device 220 may perform random access to the target access network device based on the third information. With the help of the third information, a random access success probability of the terminal device 220 may be increased. For example, the target access network device 212 supports a plurality of networks, and may divide available air interface random access channel (RACH) resource sets based on the supported networks. Because the third information clearly indicates the target network to which the terminal device 220 is to be handed over, the terminal device 220 may determine, from the RACH resource set, a RACH resource allocated to the target network, and initiate random access to the target access network device 212 on the determined RACH resource. By using the RACH resource associated with the target network, a random access success rate of the terminal device 220 can be increased. In some embodiments, if the random access process is successfully completed, the serving network of the terminal device 220 is changed to the target network. The terminal device 220 may access the target network through the target access network device 212, and in particular, access the target network slice in the target network.

In addition to guiding the random access process, or alternatively, the terminal device 220 may further display the identifier of the target network based on the received third information. The displayed identifier of the target network may be a PLMN, a name of a network operator of the PLMN, or the like. In this way, a user of the terminal device 220 may be notified of a change of the serving network.

In some embodiments, in addition to the third information, the source access network device 210 may further transmit other information to the terminal device 220, to indicate that the terminal device 220 needs to access a specific target network slice in the target network, where the current session of the terminal device 220 is handed over from being served by the current serving network slice to being served by the target network slice. The information is referred to as "fourth information" in this specification. In some examples, the fourth information may include the identifier of the target network slice. By receiving the fourth information, the terminal device 220 may quickly learn of the target network slice to which the session is to be handed over. In some embodiments, the fourth information may be included in the RRC reconfiguration message transmitted by the source access network device 210 to the terminal device 220. For example, the fourth information may be sent to the terminal device 220 together with the third information.

It should be understood that the example in which access is allowed after the target access network device 212 performs access control is discussed above. If the target access network device 212 rejects access of the terminal device 220 after performing access control, interaction between the target access network device 212, the source access network device 210, and the terminal device 220 may be different. For example, when access is rejected, the source access network device 210 does not send the RRC reconfiguration message to the terminal device 220, and the terminal device 220 does not perform random access to the target access network device 212 either.

2.3 Example Implementation Based on the Manner B

FIG. 5 is a signaling diagram of a communication process 500 of each communication entity in the embodiment of the manner A in FIG. 3.

Initially, the terminal device 220 is currently served by a source network through the source access network device 210. In other words, the source network is a current serving network of the terminal device 220. The terminal device 220 transmits the session setup request in 502, for example, the PDU session setup request, to the source access network device 210. The session setup request is a non-access stratum (NAS) message, and may be used to request to set up a session for a service of a type, for example, a session carrying a service of an application on the terminal device. The session setup request may carry the identifier of the serving network of the terminal device 220. In some embodiments, the session setup request may further include an identifier of a network slice that the terminal device 220 requests to access for the session that is to be set up.

The source access network device 210 receives the session setup request in 504, and transmits the session setup request for the terminal device 220 in 506 to the core network device 330. In response to receiving the session setup request in 508, the core network device 330 may perform a corresponding session setup process. In addition, the core network device 330 determines the first information to be provided to the source access network device 210. The first information is determined based on the information discussed above with reference to the manner B in FIG. 3. As described above, in the manner B, the first information is specific to the terminal device 220, and indicates the relationship between one or more network slices in the serving network of the terminal device 220 and one or more network slices in the second network. After the first information is determined, the core network device 330 transmits the session resource setup request in 510 to the source access network device 210, and includes the determined first information in the session resource setup request.

The source access network device 210 receives the first information in 512 from the core network device 330. The first information may be used to assist in implementing access control on the terminal device 220 when the terminal device 220 needs to be handed over. FIG. 5 further illustrates an example of access control in a handover scenario. Specifically, if the source access network device 210 determines to initiate handover for the terminal device 220, for example, determines to hand over the terminal device 220 from the current serving network (namely, the first network) to a different target network (namely, the second network), the source access network device 210 transmits the handover request in 516 to the target access network device 212.

In the example in FIG. 5, in addition to the information mentioned in the example in FIG. 4, the handover request further includes the first information. The first information carried in the handover request may be the first information received by the source access network device 210 from the core network device 330. In another example, the handover request may include a part of the first information received from the core network device 330, and the part of information indicates the relationship, such as a re-mapping relationship, between one or more network slices in the serving network and one or more network slices in the target network.

In response to receiving the handover request from the source access network device 210 in 518, the target access network device 212 performs access control from the terminal device 220 to the target access network device 212 in 520. Some embodiments of access control performed by the target access network device 212 are discussed above with reference to FIG. 3, and are not described herein again.

The example in FIG. 5 further continues to describe operations performed by the target access network device 212, the source access network device 210, and the terminal device 220 when it is determined that the terminal device 220 is allowed to access the target network. The operations include: The target access network device 212 transmits the handover request response in 522 to the source access network device 210; the source access network device 210 transmits third information in 526 to the terminal device 220 after receiving the handover request response in 524; and the terminal device 220 receives the third information in 528, and uses the third information in 530. In some embodiments, if the source access network device 210 determines to perform re-mapping between network slices when performing access control, the source access network device 210 may further transmit fourth information to the terminal device. Operations from 522 to 530 in the process 500 are similar to operations from 422 to 430 in the process 400. Details are not described herein again.

3. Second Implementation of this Disclosure

According to some embodiments of this disclosure, another solution is further provided to support a target access network device in performing access control on a terminal device. The target access network device obtains slice identification information of a network slice of the terminal device in a home network, and further obtains slice correspondence information, where the slice correspondence information indicates information about a correspondence between a network slice in a visited network and the network slice in the home network of the terminal device. Access control from the terminal device to the target access network device is performed based on the slice identification information and the slice correspondence information. In this manner, the target access network device can perform access control on the terminal device during cross-network access, especially access control performed when the terminal device needs to access the visited network, to reduce an access latency, reduce a service interruption problem caused by session rejection of the terminal device, and ensure service continuity of the terminal device.

Figure 6:
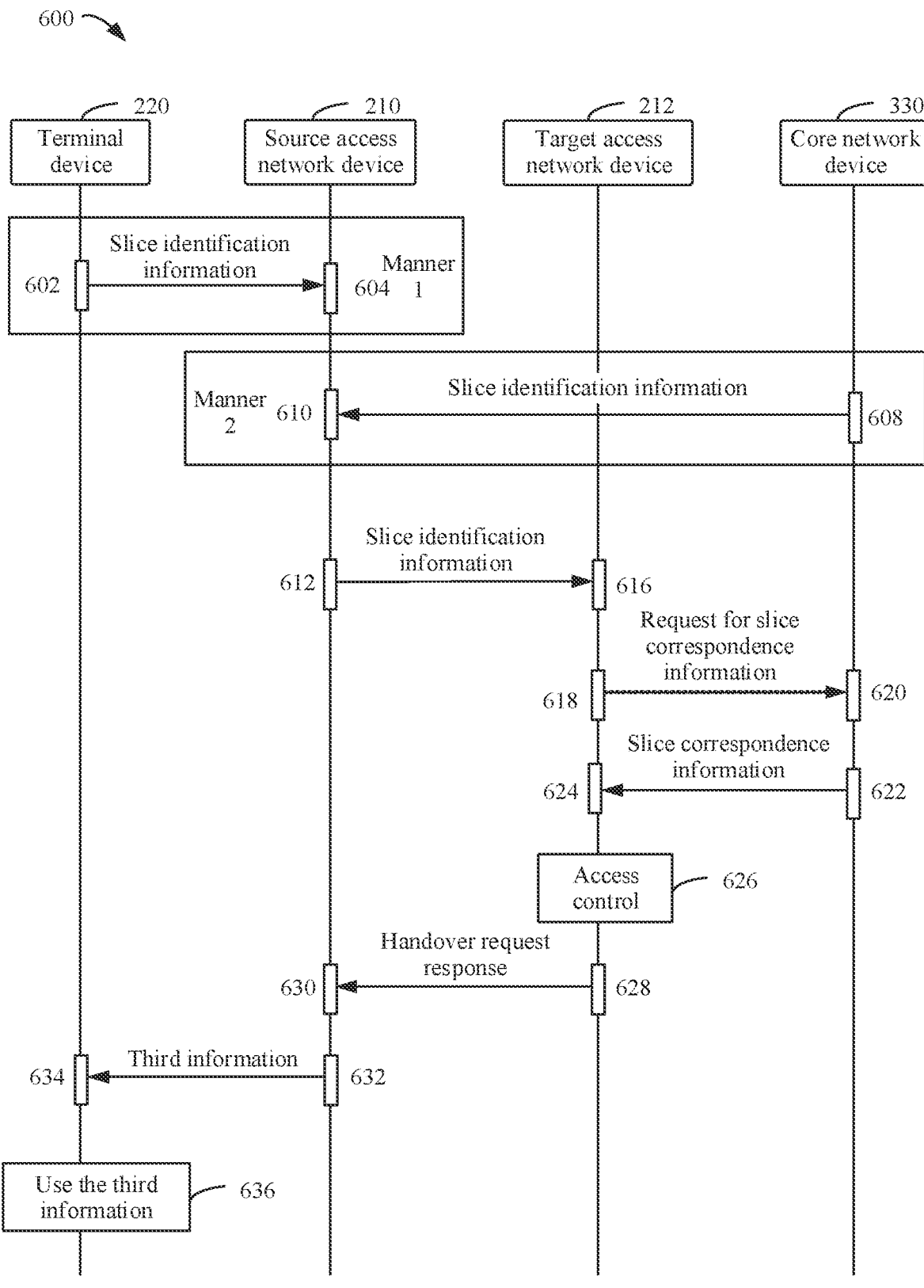
FIG. 6 is a signaling exchange diagram of a communication process according to yet some embodiments of this disclosure.

The following discusses example embodiments of this disclosure in detail with reference to the accompanying drawings. In FIG. 6, definitions of communication entities including a terminal device 220, a source access network device 210, a target access network device 212, and a core network device 330 are the same as those discussed above with reference to FIG. 3.

FIG. 6 is a signaling exchange diagram of a communication process 600 according to some embodiments of this disclosure. In the embodiment in FIG. 6, the terminal device 220 needs to be handed over from a current serving network to a target network in which the target access network device 212 is located, and the target network is a visited network (sometimes referred to as a "second visited network" in this specification) of the terminal device 220.

In the embodiment in FIG. 6, to assist the target access network device 212 in performing access control on the terminal device 220, slice identification information needs to be provided for the target access network device 212, to indicate an identifier of a home network slice of the terminal device in a home network (for example, an HPLMN), and slice correspondence information needs to be further provided for the target access network device 212, to indicate a correspondence between a network slice in the visited network (for example, a VPLMN) and a network slice in the home network of the terminal device 220. The visited network indicated in the slice correspondence information is the target network in which the target access network device 212 is located. How to provide these pieces of information to the target access network device 212 is specifically discussed below.

The source access network device 210 may provide the slice identification information for the target access network device 212. In some cases, the source access network device 210 may alternatively be located in a visited network (sometimes referred to as a "first visited network" in this specification) of the terminal device 220, that is, the terminal device 220 is roaming, and a current serving network of the terminal device 220 is the visited network. Because the source access network device 210 is located in the visited network of the terminal device 220, the source access network device 210 may not have the slice identification information related to the home network of the terminal device 220. In this case, the source access network device 210 may obtain the required slice identification information in a plurality of manners, including a manner 1 and a manner 2 discussed below.

In the manner 1, as shown in FIG. 6, the terminal device 220 transmits the slice identification information in 602 to the source access network device 210, and the source access network device 210 receives the slice identification information in 604. The slice identification information indicates the identifier of the home network slice of the terminal device 220 in the home network. Herein, the home network slice is a network slice corresponding to a current session of the terminal device 220 in the home network. The terminal device 220 usually has such information about the home network.

In some embodiments, the slice identification information may include the identifier of the home network slice, for example, S-NSSAI. In some embodiments, the slice identification information further carries an identifier of the home network, to more clearly indicate that the carried slice identification information is identification information supported in the home network. For example, the slice identification information may be represented as H_S-NSSAI 1, where H indicates the identifier of the home network, and S-NSSAI 1 indicates the identifier of the home network slice. In some embodiments, the slice identification information may be included in a session setup request, for example, included in a PDU session setup request. The session setup request may be transmitted to the source access network device 210 as a NAS message. In another embodiment, the terminal device 220 may alternatively transmit the slice identification information to the source access network device 210 by using another message/other signaling.

In some embodiments, the slice identification information may further indicate an identifier of a network slice of the terminal device 220 in a source network (namely, the current serving network). The network slice in the serving network is a serving network slice that is in the serving network and that is accessed by the terminal device 220 through the source access network device 210. The network slice may be used to serve a current session of the terminal device 220. For example, the slice identification information includes the identifier of the network slice in the source network. The identifier of the network slice in the source network may be represented as V1_S-NSSAI 2, where V1 indicates the serving network, and S-NSSAI 2 indicates the serving network slice in the serving network.

In the manner 2, the core network device 330 transmits the slice identification information in 608 to the source access network device 210, and the source access network device 210 receives the slice identification information in 610. In some embodiments, the core network device 330 may learn of the identifier of the home network slice of the terminal device 220 in the home network from a core network side. In some embodiments, after processing a session setup request of the terminal device 220, the core network device 330 may determine the identifier of the home network slice of the terminal device 220 in the home network. The core network device 330 may include the slice identification information in a session resource setup request transmitted to the source access network device 210. In another embodiment, the core network device 330 may alternatively transmit the slice identification information to the source access network device 210 by using another message/other signaling.

In the process 600, after obtaining the slice identification information for the terminal device 220, the source access network device 210 transmits the slice identification information in 612 to the target access network device 212. In some embodiments, when determining to initiate handover for the terminal device 220, the source access network device 210 may transmit the slice identification information to the target access network device 212. For example, the slice identification information may be included in a handover request sent by the source access network device 210 to the target access network device 212. In addition to the slice identification information, as mentioned above, the handover request may further include an identifier of the serving network of the terminal device 220, an identifier of a serving network slice accessed by the terminal device 220 in the serving network, an identifier of the target network to which the terminal device 220 is to be handed over, and the like.

The target access network device 212 receives the slice identification information in 616. The target access network device 212 may further obtain the slice correspondence information, to indicate the correspondence between the network slice in the visited network in which the target access network device is located and the network slice in the home network of the terminal device 220. A correspondence between two network slices in two networks means that network slices indicated by different identifiers in the two networks actually correspond to each other, that is, are a same network slice.

The slice correspondence information is required because a same network slice may be indicated by different identifiers in different networks. Because the target access network device 212 is located in the visited network of the terminal device 220, the target access network device 212 cannot determine, based on only the identification information of the home network slice, a network slice corresponding to a current session of the terminal device 220 in the visited network. With the help of the slice correspondence information, the target access network device 212 may determine the network slice that is in the visited network and that corresponds to the home network slice. In some cases, the slice correspondence information may also be referred to as network slice mapping information.

In FIG. 6, the core network device 330 transmits the slice correspondence information in 622 to the target access network device 212. In some embodiments, the core network device 330 may receive a request for the slice correspondence information transmitted by the target access network device 212 from 618 to 620. The request may include a device identifier of the terminal device 220 and the identifier (for example, a PLMN ID) of the visited network (namely, a network in which the target access network device 212 is located, which is also referred to as the target network during handover) to which the terminal device 220 is to be handed over. In some embodiments, the request may further include a subscription permanent identifier (SUPI) of the terminal device 220.

In response to the request from the target access network device 212, the core network device 330 transmits the slice correspondence information to the target access network device 212. The core network device 330 may determine the home network of the terminal device 220 by using the device identifier carried in the request. In some embodiments, if the request further includes an SUPI, the core network device 330 may determine the home network more quickly. Further, the core network device 330 may determine the corresponding slice correspondence information by using the identifier of the visited network in the request.

After receiving the slice correspondence information from the core network device 330 in 624, the target access network device 212 performs access control from the terminal device 220 to the target access network device 212 in 626 based on the slice correspondence information and the slice identification information mentioned above, to determine whether to allow the terminal device 220 to be handed over to the network in which the target access network device 212 is located.

In some embodiments, when performing access control, the target access network device 212 determines, based on the identifier (for example, H_S-NSSAI 1) of the home network slice of the terminal device 220 and the correspondence that is between the network slices in the home network and the visited network and that is indicated by the slice correspondence information, a network slice (referred to as a "visited network slice") corresponding to the home network slice of the terminal device 220 in the visited network. For example, the visited network slice may be identified as V2_S-NSSAI 3, where V2 indicates the identifier of the visited network in which the target access network device 212 is located, and S-NSSAI 3 indicates an identifier of the visited network slice in the visited network.

After determining the visited network slice, the target access network device 212 may determine, based on a capability of supporting a network slice of the target access network device 212, whether the target access network device 212 can provide access to the visited network slice V2_S-NSSAI 3 for the terminal device 220. The target access network device 212 determines, based on at least a capability of supporting the visited network slice, whether to allow access of the terminal device 220.

In some embodiments, when performing access control, the target access network device 212 further determines whether the determined visited network slice can be re-mapped to another network slice in the visited network. In this way, when the visited network slice directly corresponding to the home network slice is not supported, access of the terminal device 220 is supported through re-mapping.

To support the target access network device 212 in determining a network slice to which the visited network slice can be re-mapped, in some embodiments, the core network device 330 further provides additional information for the target access network device 212, to indicate a relationship between network slices in the home network, and in particular, indicate a re-mapping relationship between network slices in the home network. The information is sometimes referred to as "fifth information" in this specification, or is referred to as re-mapping policy information of a network slice in the home network. In some embodiments, the core network device 330 may transmit the fifth information together with the slice correspondence information or separately to the target access network device 212.

In addition to the slice identification information and the slice correspondence information, the target access network device 212 further performs access control on the terminal device 220 based on the fifth information. Specifically, based on the fifth information, the target access network device 212 may determine one or more network slices, in the home network, to which a current home network slice H_S-NSSAI 1 of the terminal device 220 can be re-mapped, for example, identified by H_S-NSSAI 3 and H_S-NSSAI 4.

Further, the target access network device 212 further determines, based on the slice correspondence information, whether the network slices (for example, H_S-NSSAI 3 and H_S-NSSAI 4) that can be re-mapped to in the home network have corresponding network slices in the visited network in which the target access network device 212 is located. If the corresponding network slices exist (for example, identified by V2_S-NSSAI 3' and V2_S-NSSAI 4'), the visited network slice V2_S-NSSAI 3 may also be re-mapped to a network slice in the visited network.

In the foregoing process, the target access network device 212 may determine the re-mapped network slice of the visited network slice with the help of the fifth information and the slice correspondence information.

When performing access control, the target access network device 212 may determine, based on determining of the re-mapped network slice in the visited slice network, whether to perform re-mapping between network slices, to support access control on the terminal device 220.

The example in FIG. 6 further continues to describe operations performed by the target access network device 212, the source access network device 210, and the terminal device 220 when it is determined that the terminal device 220 is allowed to access the visited network of the target access network device 212. The operations include: The target access network device 212 transmits the handover request response in 628 to the source access network device 210; the source access network device 210 transmits third information in 632 to the terminal device 220 after receiving the handover request response in 630; and the terminal device 220 receives the third information in 634, and uses the third information in 636. In some embodiments, if the source access network device 210 determines to perform re-mapping between network slices when performing access control, the source access network device 210 may further transmit fourth information to the terminal device. Operations from 628 to 636 in the process 600 are similar to operations from 422 to 430 in the process 400. Details are not described herein again.

Some embodiments of this disclosure are discussed above. In these embodiments, the source access network device, the core network device, the terminal device, and the target access network device interact with each other, so that the target access network device has sufficient information to timely complete access control on the terminal device, especially access control in a case of cross-network handover. This avoids a cross-network handover latency, reduces a possibility of service interruption of the terminal device, and ensures service continuity of the terminal device.

Figure 7:
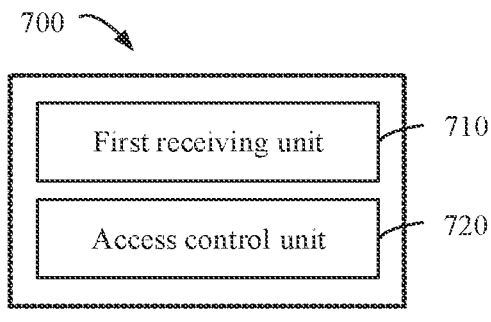
FIG. 7 is a schematic block diagram of a communication apparatus implemented at a target access network device according to some embodiments of this disclosure.

4. Embodiments of Communication Apparatuses 4.1 Implementations of the Apparatuses in a First Implementation FIG. 7 is a schematic block diagram of a communication apparatus 700 implemented at a target access network device according to some embodiments of this disclosure. The communication apparatus 700 may be implemented as a device or a chip in the device. The scope of this disclosure is not limited in this aspect. The communication apparatus 700 may be implemented as the target access network device 212 shown in FIG. 2 to FIG. 5 or a part of the target access network device 212.

As shown in the figure, the communication apparatus 700 includes: a first receiving unit 710, configured to receive first information, where the first information indicates a relationship between a first network slice in a first network and a second network slice in a second network, and the first network is different from the second network. The communication apparatus 700 further includes: an access control unit 720, configured to perform access control from a terminal device to the target access network device based on at least the first information.

In some embodiments, the first information includes an identifier of the first network, an identifier of the first network slice, an identifier of the second network, and an identifier of the second network slice. In some embodiments, the identifier of the first network and the identifier of the second network include respective public land mobile network identifiers of the first network and the second network, and the identifier of the first network slice and the identifier of the second network slice include respective single network slice selection assistance information of the first network slice and the second network slice.

In some embodiments, the first information is re-mapping policy information used for the first network slice and the second network slice.

In some embodiments, the first receiving unit 710 is further configured to receive the first information from a core network device. In some embodiments, the first network and the second network are in a same tracking area range.

In some embodiments, the first information is included in an NG setup response.

In some embodiments, the communication apparatus 700 further includes: a second receiving unit (not shown), configured to receive second information from a source access network device, where the second information includes an identifier of a third network slice allowed to be used by the terminal device in the second network. In some embodiments, the access control unit 720 is further configured to perform access control based on the first information and the second information.

In some embodiments, the first receiving unit 710 is further configured to receive the first information for the terminal device from a source access network device, where the first network is a serving network of the terminal device.

In some embodiments, the second network includes a target network of the terminal device.

In some embodiments, the first information is included in a handover request for the terminal device.

In some embodiments, the access control unit 720 is further configured to: determine, by the target access network device, an identifier of the serving network of the terminal device, an identifier of a serving network slice in the serving network, and an identifier of the target network of the terminal device; determine, by the target access network device, in the first information based on the identifier of the serving network, the identifier of the serving network slice, and the identifier of the target network, a target network slice related to the serving network slice in the target network; and perform, by the target access network device, access control based on determining of the target network slice.

Figure 8:
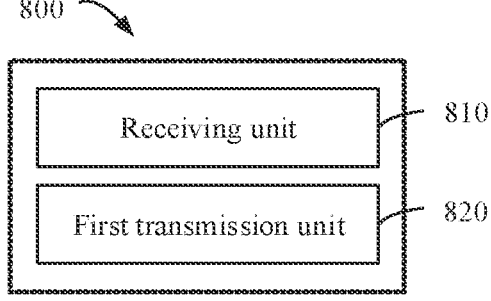
FIG. 8 is a schematic block diagram of a communication apparatus implemented at a source access network device according to some embodiments of this disclosure.

FIG. 8 is a schematic block diagram of a communication apparatus 800 implemented at a source access network device according to some embodiments of this disclosure. The communication apparatus 800 may be implemented as a device or a chip in the device. The scope of this disclosure is not limited in this aspect. The communication apparatus 800 may be implemented as the source access network device 210 shown in FIG. 2 to FIG. 5 or a part of the source access network device 210.

As shown in the figure, the communication apparatus 800 includes: a receiving unit 810, configured to receive first information for a terminal device from a core network device, where the first information indicates a relationship between a first network slice in a first network and a second network slice in a second network, the first network is a serving network of the terminal device, and the first network is different from the second network. The communication apparatus 800 further includes a first transmission unit 820, configured to transmit the first information to the target access network device.

In some embodiments, the first information includes an identifier of the first network, an identifier of the first network slice, an identifier of the second network, and an identifier of the second network slice. In some embodiments, the identifier of the first network and the identifier of the second network include respective public land mobile network identifiers of the first network and the second network, and the identifier of the first network slice and the identifier of the second network slice include respective single network slice selection assistance information of the first network slice and the second network slice.

In some embodiments, the first information is re-mapping policy information used for the first network slice and the second network slice.

In some embodiments, the second network includes a target network of the terminal device.

In some embodiments, the first information is included in a handover request for the terminal device.

In some embodiments, the communication apparatus 800 further includes: a second transmission unit (not shown), configured to transmit third information to the terminal device when access from the terminal device to the target access network device is allowed, where the third information indicates that the serving network of the terminal device is handed over from the first network to the second network.

In some embodiments, the third information includes an identifier of the second network.

In some embodiments, the third information is included in a radio resource control reconfiguration message.

In some embodiments, the communication apparatus 800 further includes: a third transmission unit (not shown), configured to transmit fourth information to the terminal device if access from the terminal device to the target access network device is allowed, where the fourth information indicates that a session of the terminal device is changed to be served by the second network slice in the second network.

Figure 9:
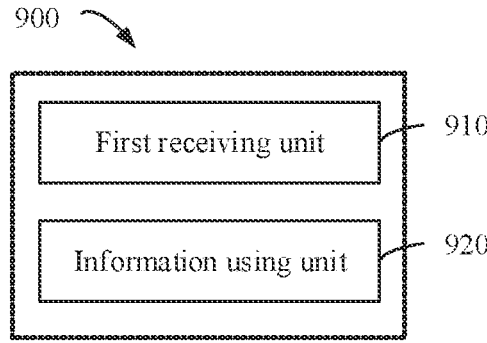
FIG. 9 is a schematic block diagram of a communication apparatus implemented at a terminal device according to some embodiments of this disclosure.

FIG. 9 is a schematic block diagram of a communication apparatus 900 implemented at a terminal device according to some embodiments of this disclosure. The communication apparatus 900 may be implemented as a device or a chip in the device. The scope of this disclosure is not limited in this aspect. The communication apparatus 900 may be implemented as the terminal device 220 shown in FIG. 2 to FIG. 5 or a part of the terminal device 220.

As shown in the figure, the communication apparatus 900 includes: a first receiving unit 910, configured to receive third information from a source access network device, where the third information indicates that a serving network of the terminal device is handed over from a first network to a second network, and the first network is different from the second network. The communication apparatus 900 further includes: an information using unit 920, configured to use the third information.

In some embodiments, the information using unit 920 is configured to perform random access to a target access network device in the second network based on the third information. In some embodiments, the information using unit 920 is configured to display an identifier of the second network based on the third information.

In some embodiments, the third information includes an identifier of the second network.

In some embodiments, the third information is included in a radio resource control reconfiguration message.

In some embodiments, the communication apparatus 900 further includes: a second receiving unit (not shown), configured to receive fourth information from the source access network device if access from the terminal device to a target access network device is allowed, where the fourth information indicates that a session of the terminal device is changed to be served by the second network slice in the second network.

Figure 10:
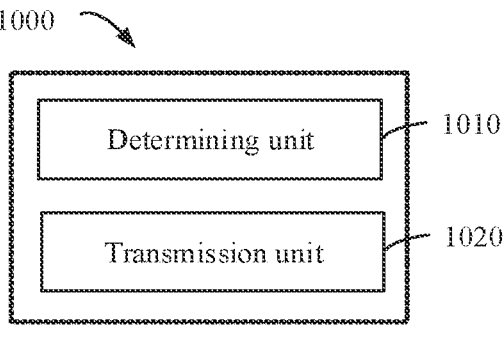
FIG. 10 is a schematic block diagram of a communication apparatus implemented at a core network device according to some embodiments of this disclosure.

FIG. 10 is a schematic block diagram of a communication apparatus 1000 implemented at a core network device according to some embodiments of this disclosure. The communication apparatus 1000 may be implemented as a device or a chip in the device. The scope of this disclosure is not limited in this aspect. The communication apparatus 1000 may be implemented as the core network device 330 shown in FIG. 2 to FIG. 5 or a part of the core network device 330. The core network device 330 includes, for example, an AMF 230 and/or a network function of another core network.

As shown in the figure, the communication apparatus 1000 includes: a determining unit 1010, configured to determine first information, where the first information indicates a relationship between a first network slice in a first network and a second network slice in a second network, and the first network is different from the second network. The communication apparatus 1000 further includes: a transmission unit 1020, configured to transmit the first information to an access network device, so that the access network device performs access control from the terminal device to the access network device.

In some embodiments, the first information includes an identifier of the first network, an identifier of the first network slice, an identifier of the second network, and an identifier of the second network slice. In some embodiments, the identifier of the first network and the identifier of the second network include respective public land mobile network identifiers of the first network and the second network, and the identifier of the first network slice and the identifier of the second network slice include respective single network slice selection assistance information of the first network slice and the second network slice.

In some embodiments, the first information is re-mapping policy information used for the first network slice and the second network slice.

In some embodiments, the first network is a serving network of the terminal device, and the terminal device is served by the first network through the access network device. In some embodiments, the second network includes a target network of the terminal device.

In some embodiments, the first network and the second network are in a same tracking area range.

In some embodiments, the first information is included in an NG setup response.

4.2 Implementations of the Apparatuses in a Second Implementation

Figure 11:
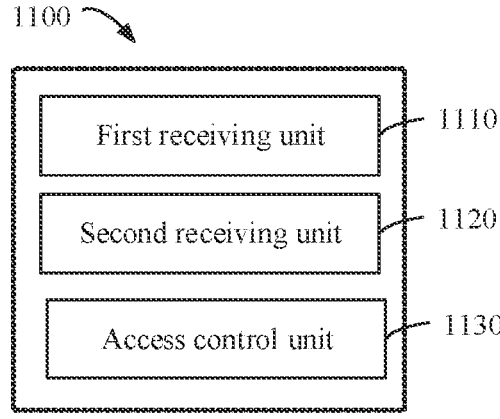
FIG. 11 is a schematic block diagram of a communication apparatus implemented at a target access network device according to some other embodiments of this disclosure.

FIG. 11 is a schematic block diagram of a communication apparatus 1100 at a target access network device according to some embodiments of this disclosure. The communication apparatus 1100 may be implemented as a device or a chip in the device. The scope of this disclosure is not limited in this aspect. The communication apparatus 1100 may be implemented as the target access network device 212 shown in FIG. 2 and FIG. 6 or a part of the target access network device 212.

As shown in the figure, the communication apparatus 1100 includes: a first receiving unit 1110, configured to receive slice identification information from a source access network device, where the slice identification information indicates an identifier of a home network slice of a terminal device in a home network, and the target access network device is located in a visited network of the terminal device. The communication apparatus 1100 further includes: a second receiving unit 1120, configured to receive slice correspondence information from a core network device, where the slice correspondence information indicates a correspondence between a network slice in the visited network and a network slice in the home network. The communication apparatus 1100 further includes an access control unit 1130, configured to perform access control from the terminal device to the target access network device based on at least the slice identification information and the slice correspondence information.

In some embodiments, the communication apparatus 1100 further includes: a transmission unit (not shown), configured to transmit a request for the network slice correspondence information to the core network device, where the request includes at least a device identifier of the terminal device and an identifier of the visited network. In some embodiments, the first receiving unit 1110 is further configured to: receive a response to the request from the core network device, and obtain the network slice correspondence information from the response.

In some embodiments, the communication apparatus 1100 further includes: a third receiving unit (not shown), configured to receive fifth information for the home network from the core network device, where the fifth information indicates a relationship between the home network slice and another network slice in the home network. In some embodiments, the access control unit 1130 is further configured to perform access control based on the slice identification information, the network slice correspondence information, and the fifth information.

Figure 12:
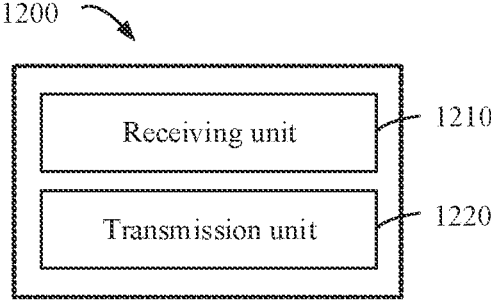
FIG. 12 is a schematic block diagram of a communication apparatus implemented at a source access network device according to some other embodiments of this disclosure.

FIG. 12 is a schematic block diagram of a communication apparatus 1200 at a source access network device according to some embodiments of this disclosure. The communication apparatus 1200 may be implemented as a device or a chip in the device. The scope of this disclosure is not limited in this aspect. The communication apparatus 1200 may be implemented as the source access network device 210 shown in FIG. 2 and FIG. 6 or a part of the source access network device 210.

As shown in the figure, the communication apparatus 1200 includes: a receiving unit 1210, configured to receive slice identification information for a terminal device, where the slice identification information indicates an identifier of a home network slice of the terminal device in a home network, and the source access network device is located in a first visited network of the terminal device. The communication apparatus 1200 further includes: a transmission unit 1220, configured to transmit the slice identification information to a target access network device to which the terminal device is to be handed over, where the target access network device is located in a second visited network of the terminal device.

In some embodiments, the receiving unit is further configured to receive, by the source access network device, the slice identification information from the terminal device or a core network device.

In some embodiments, the slice identification information is included in a session setup request received from the terminal device.

In some embodiments, the slice identification information is included in a session resource setting request that is for the terminal device and that is received from the core network device.

Figure 13:
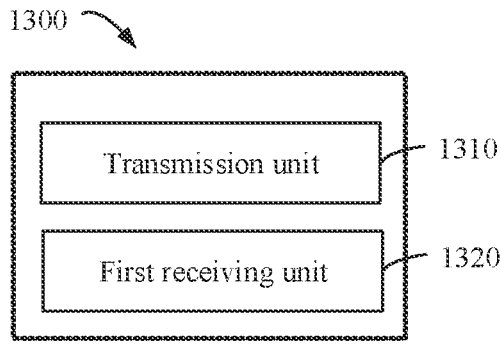
FIG. 13 is a schematic block diagram of a communication apparatus implemented at a terminal device according to some other embodiments of this disclosure.

FIG. 13 is a schematic block diagram of a communication apparatus 1300 at a terminal device according to some embodiments of this disclosure. The communication apparatus 1300 may be implemented as a device or a chip in the device. The scope of this disclosure is not limited in this aspect. The communication apparatus 1300 may be implemented as the terminal device 220 shown in FIG. 2 and FIG. 6 or a part of the terminal device 220.

As shown in the figure, the communication apparatus 1300 includes: a transmission unit 1310, configured to transmit slice identification information, where the slice identification information indicates an identifier of a home network slice of the terminal device in a home network. In these embodiments, a source access network device is located in a first visited network of the terminal device. The communication apparatus 1300 further includes: a first receiving unit 1320, configured to receive third information from the source access network device, where the third information indicates that a serving network of the terminal device is handed over from the first visited network to a second visited network, and the first visited network is different from the second visited network.

In some embodiments, the transmission unit 1310 is further configured to transmit the slice identification information to the source access network device in a session setup request.

In some embodiments, the communication apparatus 1300 further includes: an information using unit (not shown), configured to use the third information. In some embodiments, the information using unit is further configured to perform random access to a target access network device in the second visited network based on the third information. In some embodiments, the information using unit is further configured to display an identifier of the second visited network based on the third information.

In some embodiments, the third information includes an identifier of the second visited network.

In some embodiments, the third information is included in a radio resource control reconfiguration message.

In some embodiments, the communication apparatus 1300 further includes: a second receiving unit (not shown), configured to receive fourth information from the source access network device if access from the terminal device to a target access network device is allowed, where the fourth information indicates that a session of the terminal device is changed to be served by a second visited network slice in the second visited network.

5. Embodiment of a Device

Figure 14:
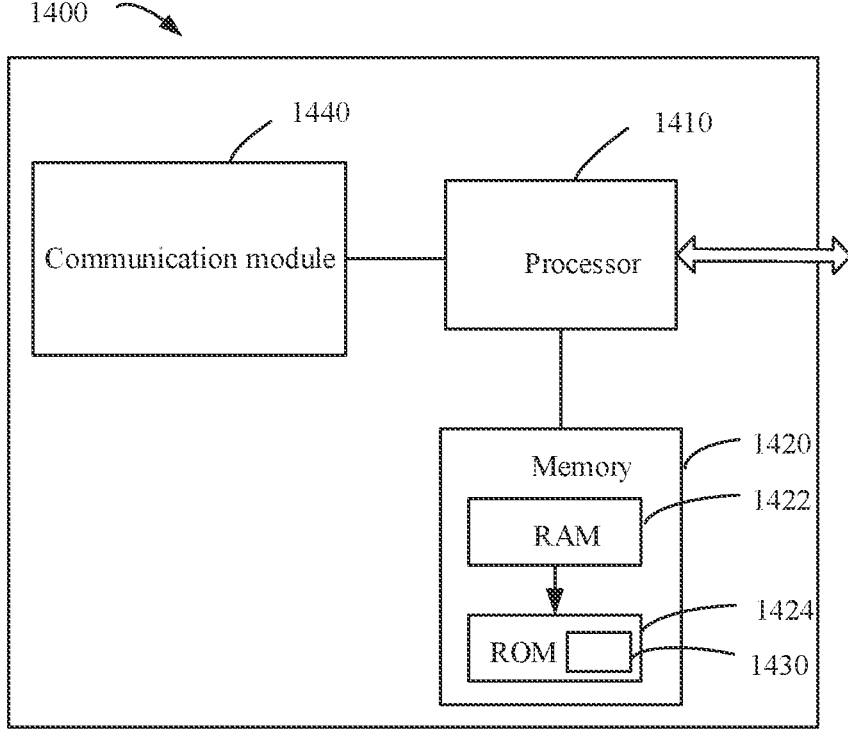
FIG. 14 is a simplified block diagram of an example device applicable for implementing embodiments of this disclosure.

FIG. 14 is a simplified block diagram of an example device 1400 applicable for implementing embodiments of this disclosure. The device 1400 may be configured to implement the terminal device, the access network device, and one or more core network devices/network functions shown in FIG. 2. As shown, the device 1400 includes one or more processors 1410, one or more memories 1420 coupled to the processor 1410, and a communication module 1440 coupled to the processor 1410.

The communication module 1440 may be configured to perform bidirectional communication. The communication module 1440 may have at least one communication interface for communication. The communication interface may include any interface necessary for communicating with another device.

The processor 1410 may be any type suitable for a local technology network, and may include, but is not limited to, one or more of a general-purpose computer, a dedicated computer, a microcontroller, a digital signal controller (DSP), or a controller-based multi-core controller architecture. The device 1400 may have a plurality of processors, such as application-specific integrated circuit chips, which in time belong to a clock synchronized with a main processor.

The memory 1420 may include one or more nonvolatile memories and one or more volatile memories. An example of the nonvolatile memory includes, but is not limited to, at least one of the following: a read-only memory (ROM) 1424, an erasable programmable read-only memory (EPROM), a flash memory, a hard disk, a compact disc (CD), a digital video disc (DVD), or another magnetic storage and/or optical storage. An example of the volatile memory includes, but is not limited to, at least one of the following: a random access memory (RAM) 1422, or another volatile memory that does not last in power-off duration.

A computer program 1430 includes computer-executable instructions executed by an associated processor 1410. The program 1430 may be stored in the ROM 1420. The processor 1410 may perform any suitable actions and processing by loading the program 1430 into the RAM 1420.

Embodiments of this disclosure may be implemented with the help of the program 1430, so that the device 1400 may perform any process discussed with reference to FIG. 3 to FIG. 6. Embodiments of this disclosure may be alternatively implemented by using hardware or a combination of software and hardware.

In some embodiments, the program 1430 may be tangibly included in a computer-readable medium, and the computer-readable medium may be included in the device 1400 (for example, in the memory 1420) or another storage device that may be accessed by the device 1400. The program 1430 may be loaded from the computer-readable medium into the RAM 1422 for execution. The computer-readable medium may include any type of tangible nonvolatile memory, such as a ROM, an EPROM, a flash memory, a hard disk, a CD, a DVD, or the like.

Usually, various embodiments of this disclosure may be implemented by hardware or a dedicated circuit, software, logic, or any combination thereof. Some aspects may be implemented by hardware, and other aspects may be implemented by firmware or software, and may be performed by a controller, a microprocessor, or another computing device. Although aspects of embodiments of this disclosure are shown and described as block diagrams, flowcharts, or some other diagrams, it should be understood that the blocks, apparatuses, systems, technologies, or methods described in this specification may be implemented as, for example, non-limiting examples, hardware, software, firmware, dedicated circuits, logic, general-purpose hardware, controllers, other computing devices, or a combination thereof.

This disclosure further provides at least one computer program product tangibly stored on a non-transitory computer-readable storage medium. The computer program product includes computer-executable instructions, such as instructions included in a program module, executed in a device on a real or virtual processor of a target, to perform the process/method described above with reference to FIG. 3 to FIG. 6. Usually, the program module includes a routine, a program, a library, an object, a class, a component, a data structure, and the like that execute a specific task or implement a specific abstract data type. In various embodiments, functions of program modules may be combined or a function of a program module may be split as needed. Machine-executable instructions for the program module may be executed locally or within a distributed device. In the distributed device, the program modules may be located in local and remote storage media.

Computer program code used to implement the methods disclosed in this disclosure may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed completely on a computer, partially on a computer, as an independent software package, partially on a computer and partially on a remote computer, or completely on a remote computer or server.

In a context of this disclosure, the computer program code or related data may be carried by any appropriate carrier, so that a device, an apparatus, or a processor can perform various processing and operations described above. Examples of the carrier include a signal, a computer-readable medium, and the like. Examples of the signal may include propagating signals in electrical, optical, radio, sound, or other forms, such as carrier waves and infrared signals.

The computer-readable medium may be any tangible medium that includes or stores a program used for or related to an instruction execution system, apparatus, or device. The computer-readable medium may be a computer-readable signal medium or a computer-readable storage medium. The computer-readable medium may include but is not limited to an electronic, magnetic, optical, electromagnetic, infrared, or semiconductor system, apparatus, or device, or any suitable combination thereof. More detailed examples of the computer-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

In addition, although the operations of the methods disclosed in this disclosure are described in a particular order in the accompanying drawings, this does not require or imply that these operations need to be performed in the particular order or that all of the shown operations need to be performed to achieve a desired result. Instead, execution orders of the steps depicted in the flowcharts may change. Additionally or optionally, some steps may be omitted, a plurality of steps may be combined into one step for execution, and/or one step may be decomposed into a plurality of steps for execution. It should further be noted that features and functions of two or more apparatuses according to this disclosure may be specified in one apparatus. On the contrary, features and functions of one apparatus described above may be further divided into a plurality of apparatuses for materialization.

The implementations of this disclosure have been described above. The foregoing descriptions are examples, are not exhaustive, and are not limited to the disclosed implementations. Many modifications and variations are apparent to a person of ordinary skill in the art without departing from the scope and spirit of the described implementations. Selection of terms used in this specification is intended to best explain implementation principles, actual application, or improvements to technologies in the market, or to enable another person of ordinary skill in the art to understand the implementations disclosed in this specification.

What is claimed is:

1. A communication method, comprising:
receiving, by a target access network device, first information from a core network device, wherein the first information indicates a relationship between a first network slice in a first network and a second network slice in a second network, and the first network is different from the second network;
receiving, by the target access network device, second information from a source access network device, wherein the second information comprises an identifier of a third network slice allowed to be used by a terminal device in the second network; and
performing, by the target access network device, access control from the terminal device to the target access network device based on at least the first information and the second information, wherein performing access control from the terminal device to the target access network device comprises determining whether the terminal device is allowed to access a target network supported by the target access network device.

2. The communication method according to claim 1, wherein the first information comprises an identifier of the first network, an identifier of the first network slice, an identifier of the second network, and an identifier of the second network slice.

3. The communication method according to claim 2, wherein the identifier of the first network and the identifier of the second network comprise respective public land mobile network identifiers of the first network and the second network, and
the identifier of the first network slice and the identifier of the second network slice comprise respective single network slice selection assistance information of the first network slice and the second network slice.

4. The communication method according to claim 1, wherein
the first network is a serving network of the terminal device.

5. The communication method according to claim 4, wherein the second network comprises the target network of the terminal device.

6. A communication apparatus, implemented at a target access network device, comprising:
a first receiver, the first receiver configured to receive first information, wherein the first information indicates a relationship between a first network slice in a first network and a second network slice in a second network, and the first network is different from the second network;
a second receiver, the second receiver configured to receive second information from a source access network device, wherein the second information comprises an identifier of a third network slice allowed to be used by a terminal device in the second network;

at least one processor; and one or more memories coupled to the at least one processor and storing programming instructions for execution by the at least one processor to perform access control from the terminal device to the target access network device based on at least the first information and the second information, wherein performing access control from the terminal device to the target access network device comprises determining whether the terminal device is allowed to access a target network supported by the target access network device.

7. The communication apparatus according to claim 6, wherein the first receiver is further configured to receive the first information from a core network device.

8. The communication apparatus according to claim 6, wherein the first receiver is further configured to:

receive the first information for the terminal device from the source access network device, wherein the first network is a serving network of the terminal device.

9. The communication apparatus according to claim 6, wherein the first information comprises an identifier of the first network, an identifier of the first network slice, an identifier of the second network, and an identifier of the second network slice.

10. The communication apparatus according to claim 9, wherein the identifier of the first network and the identifier of the second network comprise respective public land mobile network identifiers of the first network and the second network, and the identifier of the first network slice and the identifier of the second network slice comprise respective single network slice selection assistance information of the first network slice and the second network slice.

11. The communication apparatus according to claim 6, wherein the first network is a serving network of the terminal device.

12. The communication apparatus according to claim 11, wherein the second network comprises the target network of the terminal device.

13. A non-transitory computer-readable storage media comprising instructions which, when executed by one or more processors of a target access network device, cause the one or more processors to perform operations comprising:

receiving first information, wherein the first information indicates a relationship between a first network slice in a first network and a second network slice in a second network, and the first network is different from the second network;

receiving second information from a source access network device, wherein the second information comprises an identifier of a third network slice allowed to be used by a terminal device in the second network; and performing access control from the terminal device to the target access network device based on at least the first information and the second information, wherein performing access control from the terminal device to the target access network device comprises determining whether the terminal device is allowed to access a target network supported by the target access network device.

14. The non-transitory computer-readable storage media according to claim 13, wherein the first information is received from a core network device.

15. The non-transitory computer-readable storage media according to claim 13, wherein the first information is received for the terminal device from the source access network device, and wherein the first network is a serving network of the terminal device.

16. The non-transitory computer-readable storage media according to claim 13, wherein the first information comprises an identifier of the first network, an identifier of the first network slice, an identifier of the second network, and an identifier of the second network slice.

17. The non-transitory computer-readable storage media according to claim 16, wherein the identifier of the first network and the identifier of the second network comprise respective public land mobile network identifiers of the first network and the second network, and the identifier of the first network slice and the identifier of the second network slice comprise respective single network slice selection assistance information of the first network slice and the second network slice.

18. The non-transitory computer-readable storage media according to claim 13, wherein the first network is a serving network of the terminal device.

19. The non-transitory computer-readable storage media according to claim 18, wherein the second network comprises the target network of the terminal device.

* * * * *